(12) United States Patent
Takemoto et al.

(10) Patent No.: US 9,889,762 B2
(45) Date of Patent: Feb. 13, 2018

(54) CONTROL SYSTEM FOR CHARGING VEHICLE BATTERY IN RESPONSE TO AN UNSTABLE STATE

(71) Applicants: FUJITSU TEN LIMITED, Kobe-shi, Hyogo (JP); TOYOTA JIDOSHA KABUSHIKI KAISHA, Toyota-shi, Aichi (JP)

(72) Inventors: Shinji Takemoto, Kobe (JP); Daisuke Okajima, Kobe (JP); Masayuki Suzuki, Kobe (JP); Jyunya Tokinaga, Kobe (JP); Ryuichi Kamaga, Nissin (JP)

(73) Assignees: FUJITSU TEN LIMITED, Kobe (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 369 days.

(21) Appl. No.: 14/438,430

(22) PCT Filed: Oct. 21, 2013

(86) PCT No.: PCT/JP2013/079059
§ 371 (c)(1),
(2) Date: Apr. 24, 2015

(87) PCT Pub. No.: WO2014/069380
PCT Pub. Date: May 8, 2014

(65) Prior Publication Data
US 2015/0286233 A1    Oct. 8, 2015

(30) Foreign Application Priority Data

Oct. 29, 2012  (JP) ................................ 2012-238370

(51) Int. Cl.
*G06F 19/00*        (2011.01)
*B60L 11/18*        (2006.01)
(Continued)

(52) U.S. Cl.
CPC ......... *B60L 11/1861* (2013.01); *B60L 3/0046* (2013.01); *B60L 3/0084* (2013.01);
(Continued)

(58) Field of Classification Search
CPC ........ G05F 1/66; B60L 3/0046; B60L 3/0084; B60L 3/04; B60L 11/1816;
(Continued)

(56) References Cited

U.S. PATENT DOCUMENTS 5,551,043 A * 8/1996 Crump .................. G06F 1/3203
                                                    712/E9.032
5,560,022 A * 9/1996 Dunstan ................ G06F 1/3203
                                                    710/301
(Continued)

FOREIGN PATENT DOCUMENTS

JP   H06-342325 A    12/1994
JP   H07-231475 A    8/1995
(Continued)

OTHER PUBLICATIONS

Pisu, Pierluigi, and Giorgio Rizzoni. "A comparative study of supervisory control strategies for hybrid electric vehicles." IEEE Transactions on Control Systems Technology 15.3 (2007): 506-518.*
(Continued)

*Primary Examiner* — Michael D Masinick
(74) *Attorney, Agent, or Firm* — Oliff PLC

(57) ABSTRACT

An object is to avoid the situation in which the power cannot be turned off. A control system is provided in which the first and second control units are connected. At least one of the first and second control units include: a stop control section for, if a condition for ending a predetermined operation mode is satisfied in that operation mode, performing stop control for having the control system in a low-power-consumption state while communicating with the other control unit; and a mode control section for having a mode undefined state in which the operation mode is instable at restoration from a reset state and for allowing, if a predetermined transition condition for allowing transition into the (Continued)

operation mode is satisfied in the mode undefined state, transition into the operation mode whose transition condition has been satisfied.

9 Claims, 17 Drawing Sheets

(51) Int. Cl.
*B60L 3/00* (2006.01)
*B60L 3/04* (2006.01)
*G05F 1/66* (2006.01)
*G06F 1/32* (2006.01)

(52) U.S. Cl.
CPC ............ *B60L 3/04* (2013.01); *B60L 11/1816* (2013.01); *B60L 11/1868* (2013.01); *G05F 1/66* (2013.01); *B60L 2240/80* (2013.01); *G06F 1/3203* (2013.01); *Y02T 10/7005* (2013.01); *Y02T 10/7044* (2013.01); *Y02T 10/7066* (2013.01); *Y02T 10/7072* (2013.01); *Y02T 90/14* (2013.01); *Y02T 90/16* (2013.01)

(58) Field of Classification Search
CPC .............. B60L 11/1861; B60L 11/1868; B60L 2240/80; G05B 15/02; G06F 1/3203; Y02T 10/7005; Y02T 10/7044; Y02T 10/7066; Y02T 10/7072; Y02T 90/14; Y02T 90/16
See application file for complete search history.

(56) References Cited

U.S. PATENT DOCUMENTS

| | | | | |
|---|---|---|---|---|
| 5,630,142 A | * | 5/1997 | Crump | G06F 1/3203 713/323 |
| 5,715,464 A | * | 2/1998 | Crump | G06F 1/3203 712/E9.032 |
| 6,342,325 B1 | * | 1/2002 | Suda | G03G 5/08214 430/66 |
| 8,179,086 B2 | | 5/2012 | Nakaso et al. | |
| 8,281,167 B2 | | 10/2012 | Nakamura et al. | |
| 2009/0183018 A1 | * | 7/2009 | Nakamura | B60W 50/04 713/323 |
| 2011/0057611 A1 | * | 3/2011 | Nakaso | B60W 20/15 320/109 |
| 2011/0154079 A1 | * | 6/2011 | Dixon | G06F 1/3203 713/323 |
| 2011/0185208 A1 | * | 7/2011 | Iwamoto | G06F 1/3203 713/323 |
| 2011/0193531 A1 | * | 8/2011 | Sheng | H02J 7/0083 320/148 |
| 2011/0320081 A1 | * | 12/2011 | Ogura | B60L 1/00 701/22 |

FOREIGN PATENT DOCUMENTS

| | | |
|---|---|---|
| JP | 2009-166549 A | 7/2009 |
| JP | 2009-275542 A | 11/2009 |
| JP | 2010-283944 A | 12/2010 |
| JP | 2011-235770 A | 11/2011 |
| WO | 2010/047207 A1 | 4/2010 |

OTHER PUBLICATIONS

Yu, Zhihong, Donald Zinger, and Anima Bose. "An innovative optimal power allocation strategy for fuel cell, battery and supercapacitor hybrid electric vehicle." Journal of Power Sources 196.4 (2011): 2351-2359.*

Sep. 9, 2014 Office Action issued in Japanese Patent Application No. 2012-238370.

Aug. 25, 2014 International Search Report issued in International Patent Application No. PCT/JP2013/079059.

* cited by examiner

S001: RESET IS CAUSED IN ANY CONTROL UNIT
↓
MODE UNDEFINED STATE

S002: TRANSITION INTO LOW-POWER-CONSUMPTION STATE IS IMPOSSIBLE

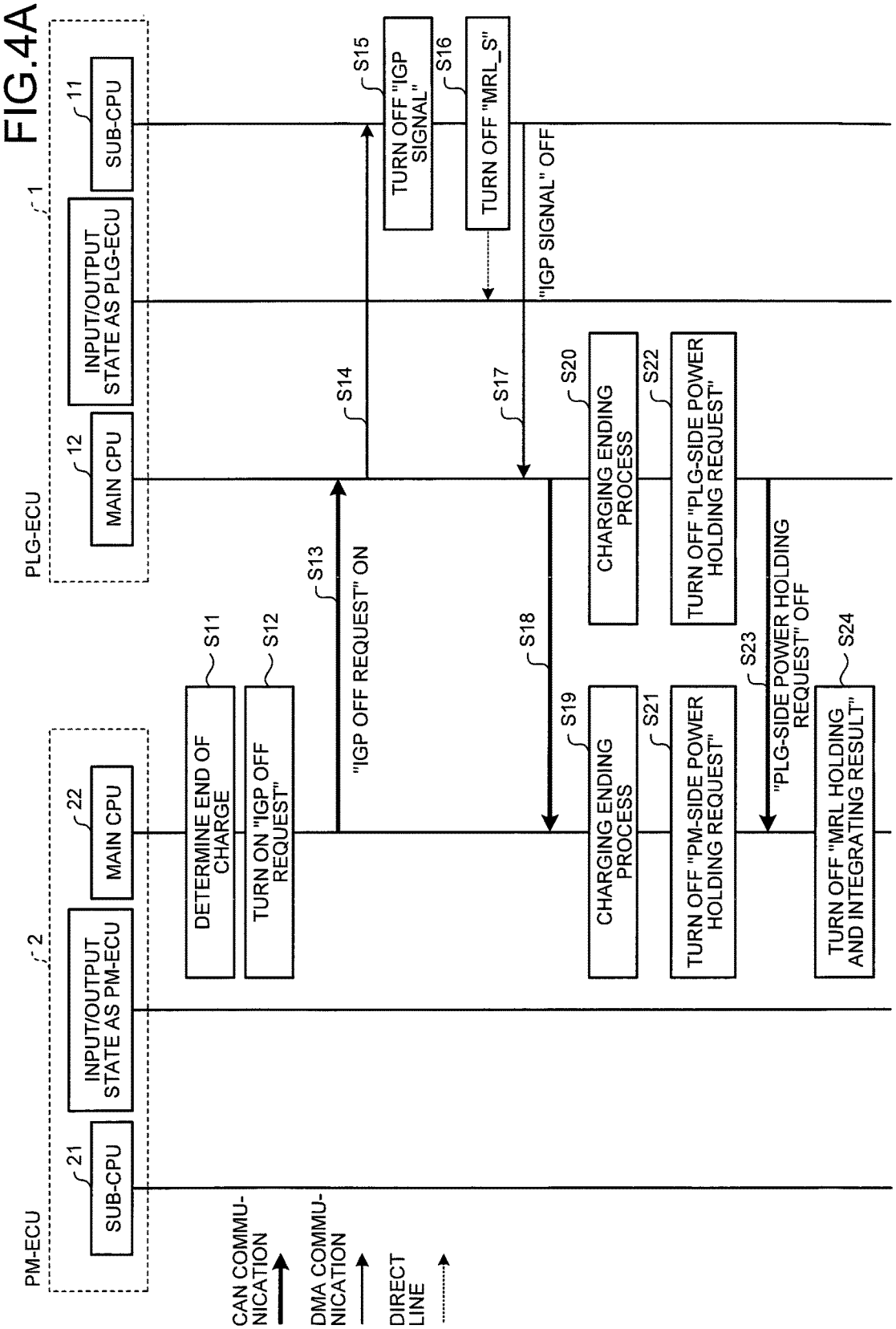

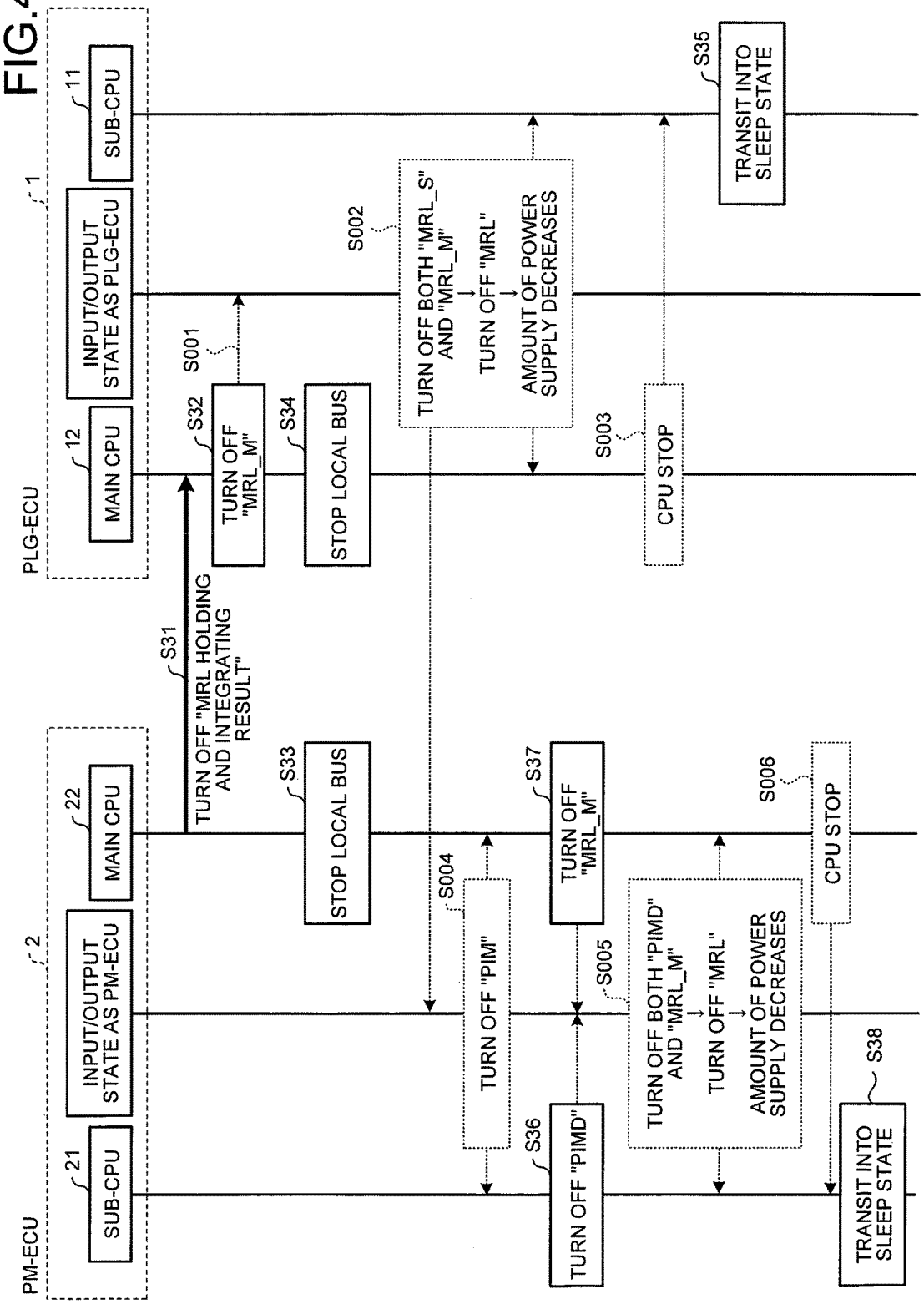

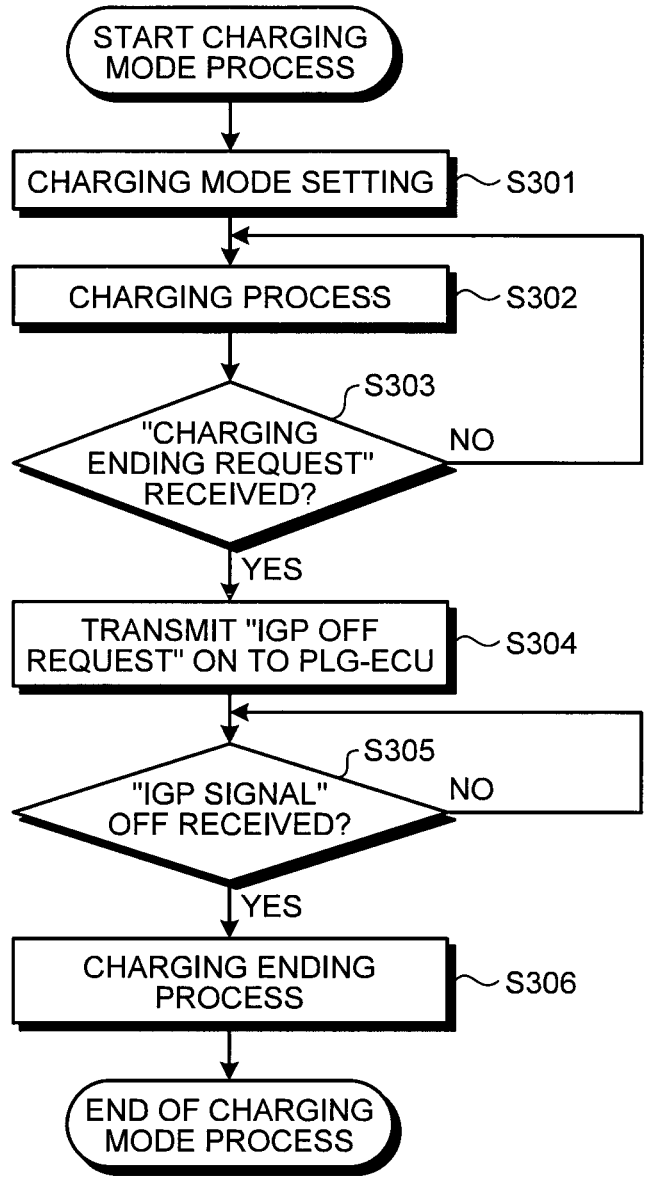

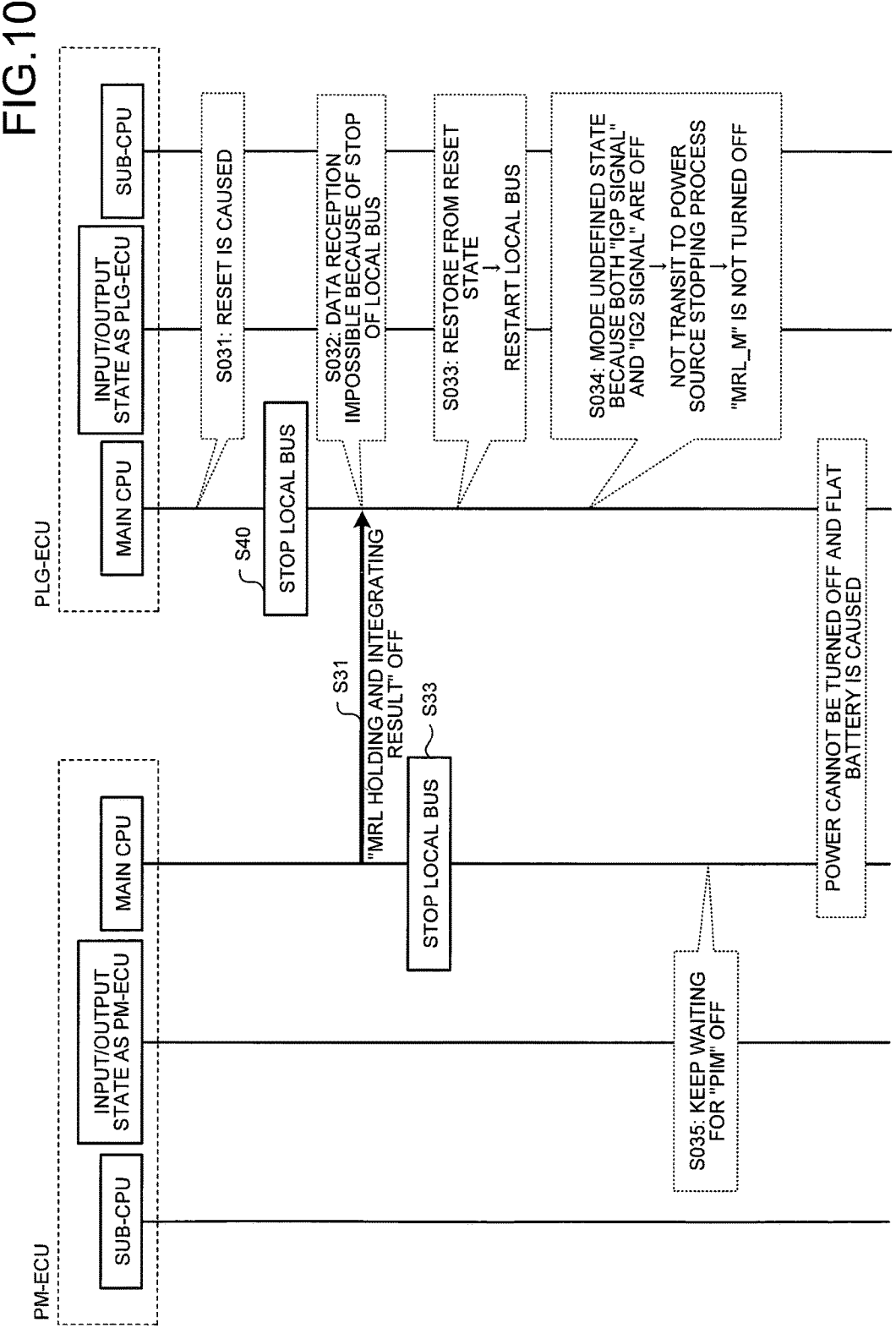

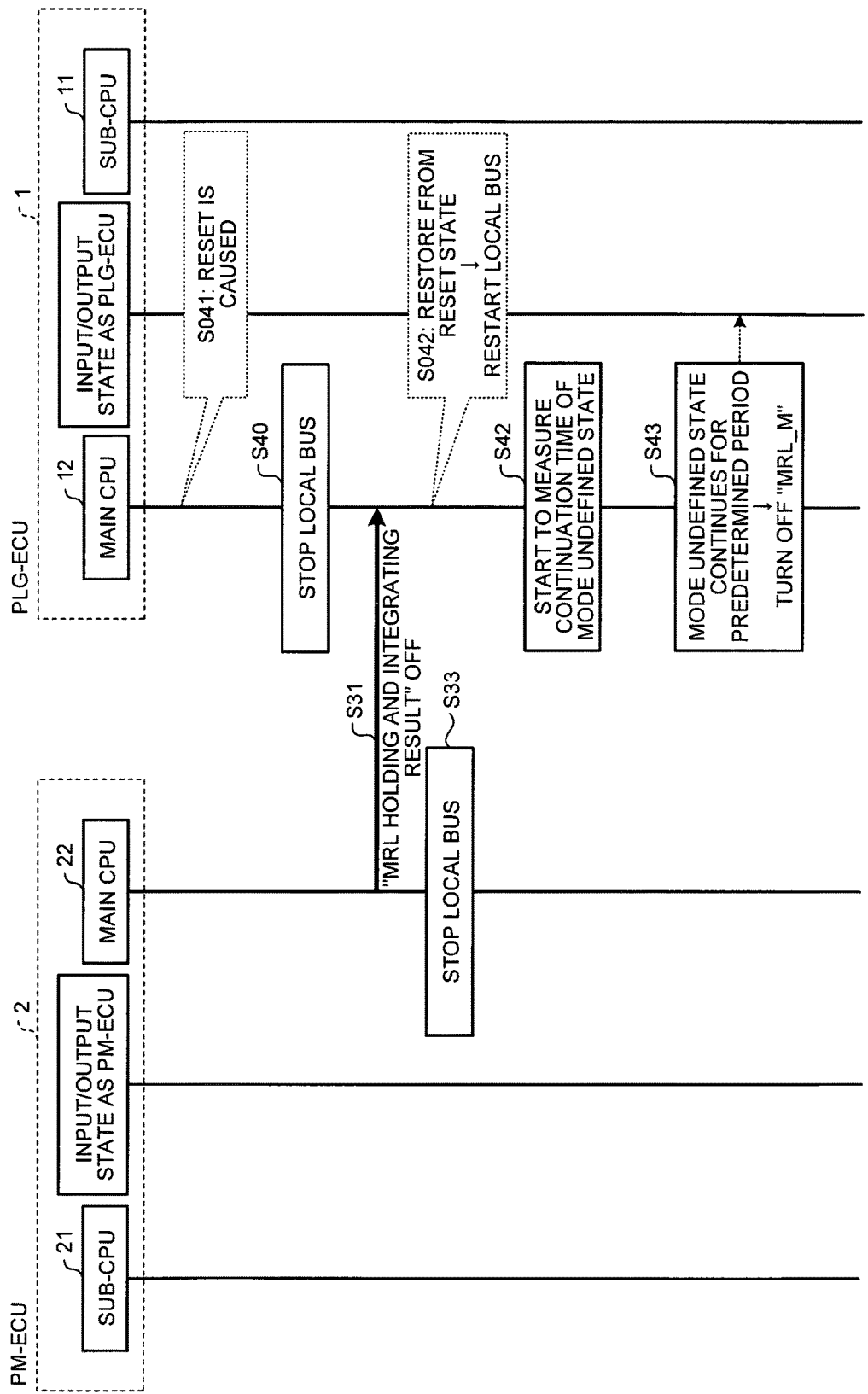

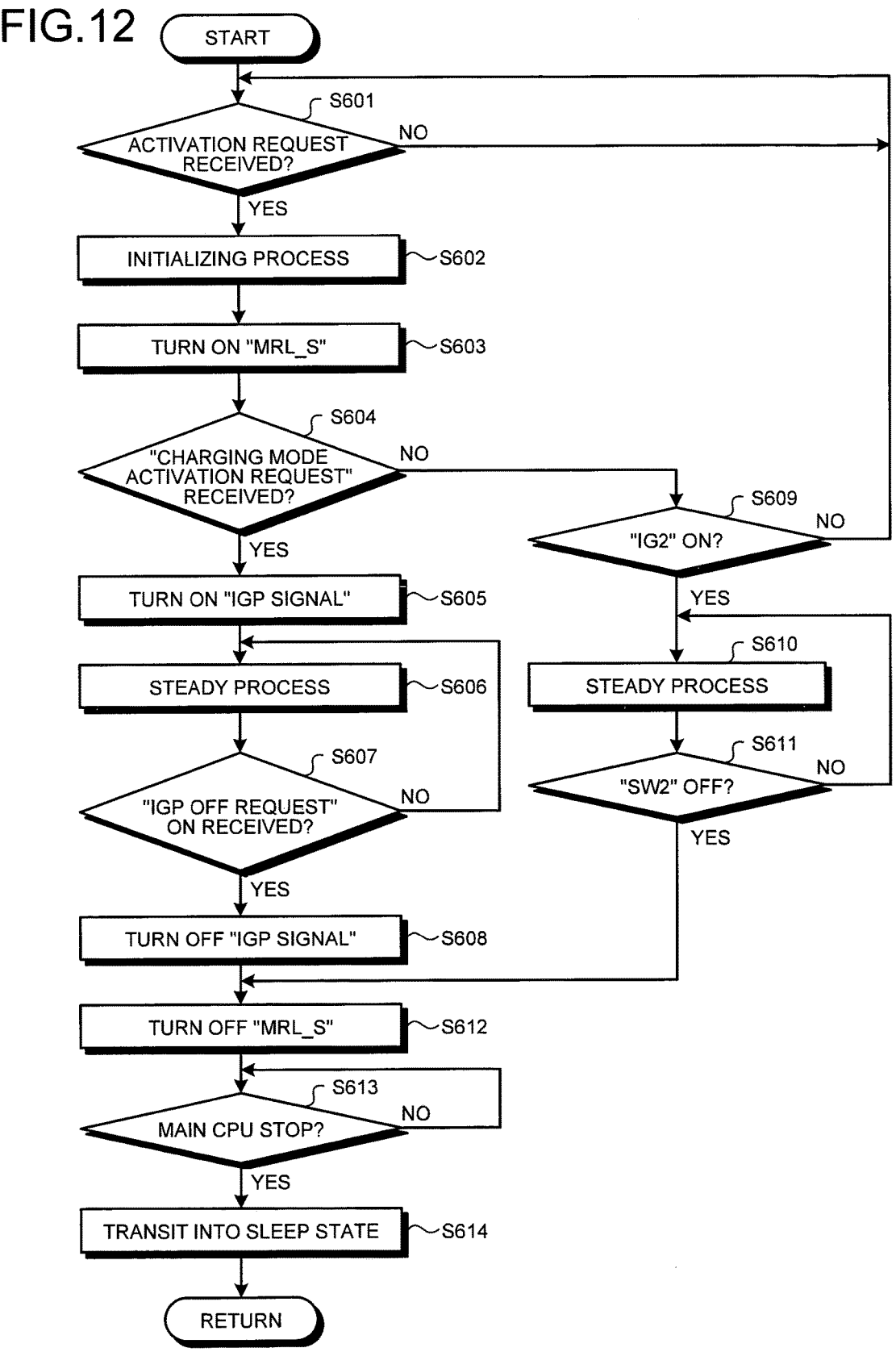

CONTROL SYSTEM FOR CHARGING VEHICLE BATTERY IN RESPONSE TO AN UNSTABLE STATE

TECHNICAL FIELD

The present invention relates to a control system.

BACKGROUND ART

A control system configured by a plurality of control units such as an engine ECU (Electronic Control Unit) and a motor ECU has conventionally been known.

In some of such control systems, each control unit has a function of detecting the abnormality in communication between the control units. Therefore, in those cases, for turning off the power of each control unit, the control devices are synchronized with each other in order to prevent the erroneous detection of the abnormality in communication.

For example, Patent Document 1 discloses a technique in which two CPUs (Central Processing Units) synchronize their timing for turning off the power by advancing the process of stopping the power supply while communicating with each other.

PRIOR ART DOCUMENTS

Patent Document 1: Japanese Laid-open Patent Publication No. 06-342325

DISCLOSURE OF INVENTION

Problem to be Solved by the Invention

In the conventional control system, however, there has been a possibility that in the occurrence of reset in any control unit, a problem is caused in the process advanced in synchronization so that the power cannot be turned off.

The technique to be disclosed has been made in order to solve the problem of the conventional technique described above, and an object is to provide a control system that can avoid the situation where the power cannot be turned off.

Means for Solving Problem

A control system according to an aspect of an embodiment comprises a first control unit and a second control unit connected to each other. At least one of the first control unit and the second control unit includes: a stop control section for, if a condition for ending a predetermined operation mode is satisfied in that operation mode, performing stop control for having the control system in a low-power-consumption state while communicating with the other control unit; and a mode control section for having a mode undefined state in which the operation mode is instable at restoration from a reset state and for allowing, when a predetermined transition condition for allowing transition into the operation mode is satisfied in the mode undefined state, transition into the operation mode whose transition condition has been satisfied. The stop control section performs the stop control also when the mode undefined state has continued for a predetermined period.

Effect of the Invention

According to the present invention, it is possible to avoid the situation where the power cannot be turned off.

BRIEF DESCRIPTION OF DRAWINGS

FIG. 4A is a sequence diagram depicting an example in which a charging mode ending process is normally performed.
FIG. 4B is a sequence diagram depicting an example in which a power supply stopping process is normally performed.
FIG. 9A is a flowchart depicting the procedure of the charging mode process executed by the main CPU of the PM-ECU.
FIG. 10 is a sequence diagram depicting a conventional example in the case where the reset is caused in the PLG-ECU during the power supply stopping process.
FIG. 11 is a sequence diagram depicting an example in the case where the reset is caused in the PLG-ECU during the power supply stopping process in the control system according to Embodiment.
FIG. 12 is a flowchart depicting the procedure of the process executed by the sub-CPU of the PLG-ECU.

BEST MODES FOR CARRYING OUT THE INVENTION

Figure 1A:
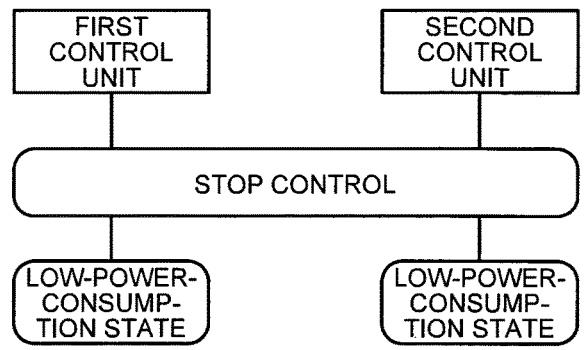
FIG. 1A is a diagram depicting the outline of a control method according to the present invention.
Figure 1B:
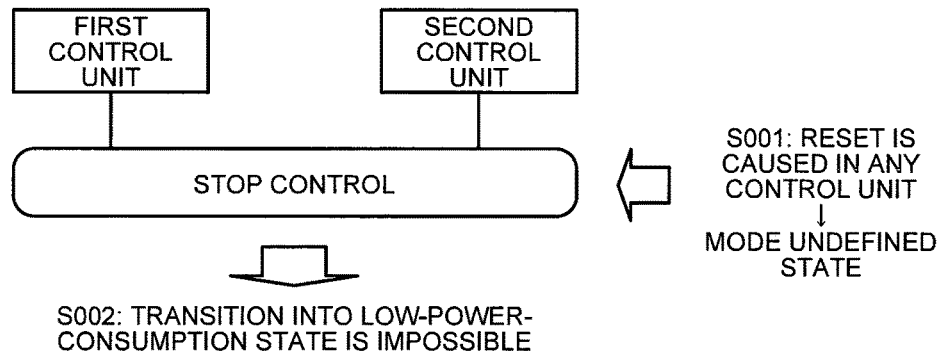
FIG. 1B is a diagram depicting the outline of a control method according to the present invention.
Figure 1C:
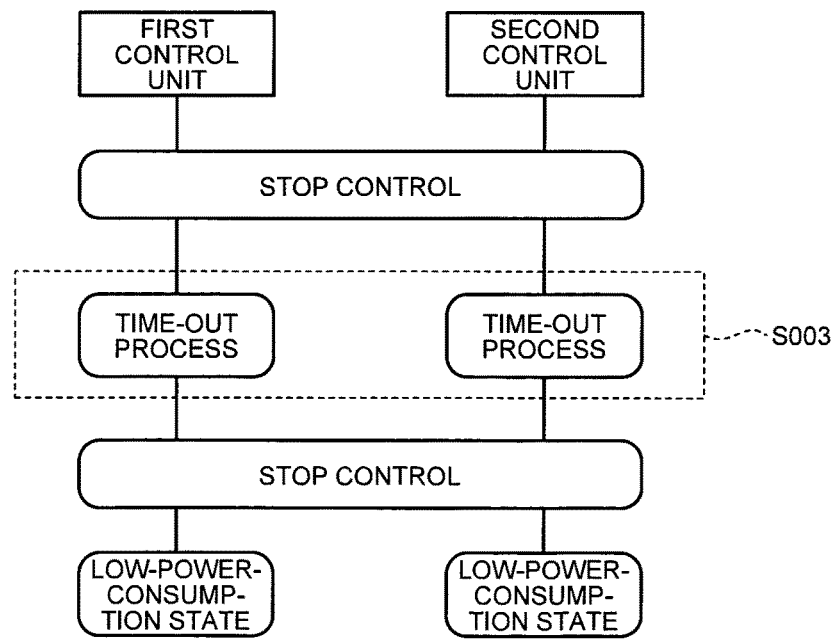
FIG. 1C is a diagram depicting the outline of a control method according to the present invention.

Embodiment of a control system according to the present invention is hereinafter described with reference to the attached drawings. Prior to the detailed description of Embodiment, the outline of a control method according to the present application is described with reference to FIG. 1A to FIG. 1C. FIG. 1A to FIG. 1C illustrate the outline of the control method according to the present application. FIG. 1A depicts the procedure of the process executed by a first control unit and a second control unit, FIG. 1B depicts a conventional example in which reset is caused in any control unit during the operation mode ending process, and FIG. 1C depicts the control method according to the present application.

As depicted in FIG. 1A, in the control method according to the present application, the first control unit and the second control unit are connected to each other. Then, in the control method according to the present application, if, in a predetermined operation mode, the condition for ending the operation mode is satisfied, at least one of the first control unit and the second control unit performs the stop control for making the system in a low-power-consumption mode while communicating with the other control unit; thus, the synchronization of the timing for transiting into the low-power-consumption mode of the first control unit and the second control unit is performed. This is because, for example, if one control unit determines the transition into the low-power-consumption mode by itself, the other control unit may recognize by mistake the occurrence of abnormality on a communication line between the control units. Note that the "low-power-consumption mode" includes the case where the power consumption is zero (i.e., the completely stopped state). Moreover, "turning off the power" includes "low-power-consumption mode".

The first control unit and the second control unit correspond to various ECUs (Electronic Control Units) connected via a communication line such as a CAN bus (Controller Area Network). The operation mode corresponds to, for example, a charging mode for charging a battery (battery) mounted on a plug-in hybrid vehicle with power from an external power source provided outside the plug-in hybrid vehicle.

In the conventional technique, as depicted in FIG. 1B, if reset is caused in any control unit, a trouble occurs in the process advanced in synchronization, in which case the transition into the low-power-consumption mode cannot be performed.

For example, when the first control unit or the second control unit is restored from the reset state, the operation mode is instable (hereinafter referred to as "mode undefined state") (see S001 in FIG. 1B), and if in this mode undefined state, a predetermined transition condition for allowing transition into any operation mode is satisfied, the operation mode is transited into the operation mode whose transition condition has been satisfied.

However, in the first control unit or the second control unit, the stop control may not be completed before the predetermined transition condition for allowing transition into any operation mode is satisfied, in which case the low-power-consumption mode cannot be achieved (see S002 in FIG. 1B).

In view of this, in the control method according to the present invention, a time-out process is added (see S003 in FIG. 1C), and if the mode undefined state continues for a predetermined period, the stop control is forced to allow the transition into the low-power-consumption mode. By the provision of the time-out process, the control method according to the present application can avoid the situation where the transition into the low-power-consumption mode is impossible.

Example of a control system to which the control method according to the present application is applied is hereinafter described in details. In Embodiment below, a control system between on-vehicle ECUs is described as an example of the control system. Further, a PLG-ECU (plug electronic control unit) as an ECU for detecting the start of a charging mode is described as one example of the first control unit and a PM-ECU (powertrain manager electronic control unit) as an ECU for executing the charging mode process together with the PLG-ECU is described as one example of the second control unit.

[Embodiment]

Figure 2:
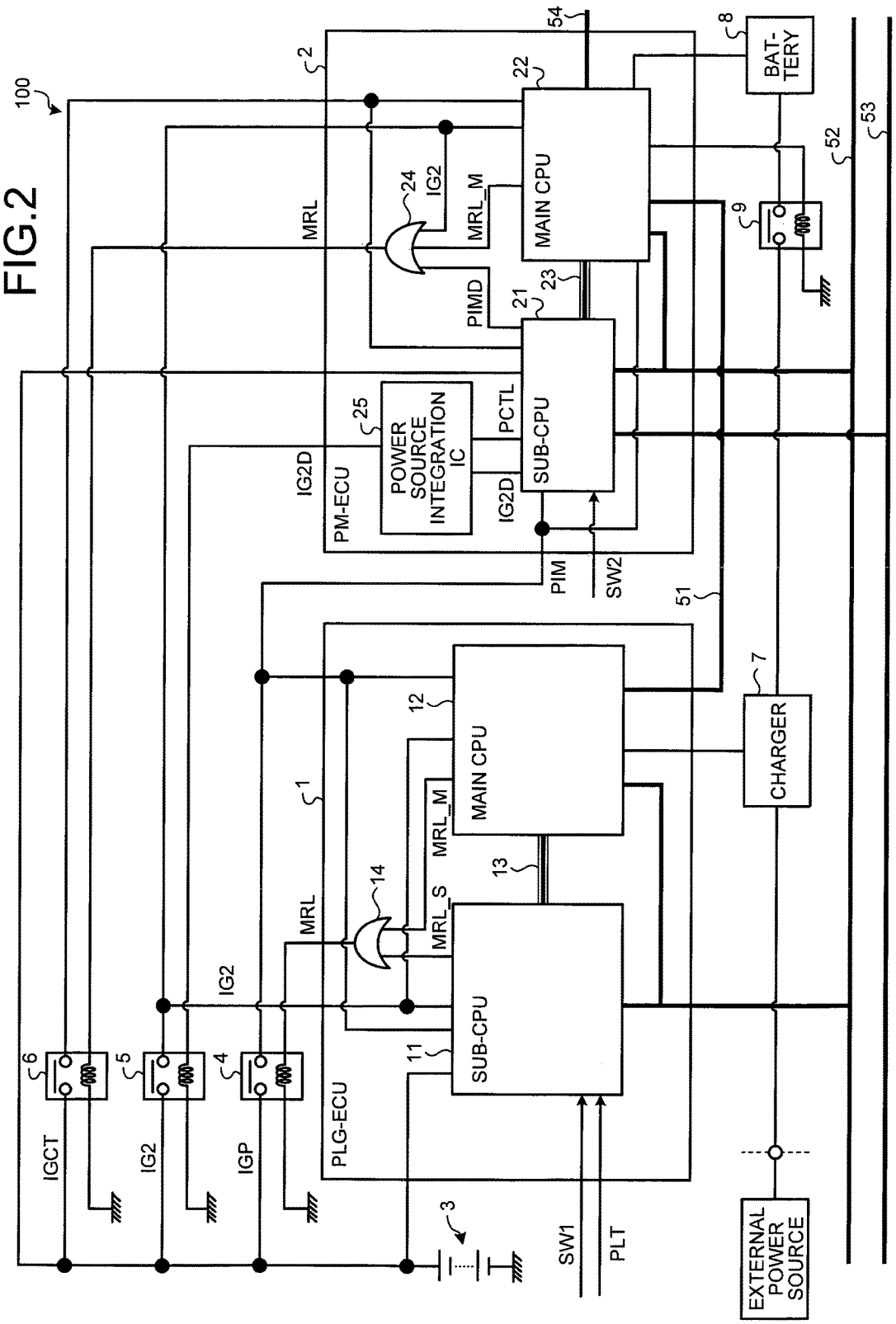
FIG. 2 is a block diagram depicting a configuration of a control system according to Embodiment.

First, a configuration example of the control system according to Embodiment is described with reference to FIG. 2. FIG. 2 is a block diagram illustrating a configuration of a control system 100 according to Embodiment.

The control system 100 is a control system mounted on, for example, a plug-in hybrid vehicle. The plug-in hybrid vehicle refers to a hybrid vehicle which can be charged from a power source provided outside the vehicle, for example, a power source for home provided in a house or an outlet of a rapid charger provided in a charging facility. The control system 100 has two operation modes: "charging mode" and "running mode". "The charging mode" refers to an operation mode executed when a charging process mainly from an external power source to the battery is performed. "The running mode" refers to an operation mode executed mainly during the running of a vehicle.

As depicted in FIG. 2, the control system 100 includes a PLG-ECU 1, a PM-ECU 2, an auxiliary battery 3, an IGP relay 4, an IG2 relay 5, an IGCT relay 6, a charger 7, a battery 8, and a system main relay 9.

The PLG-ECU 1 includes a sub-CPU 11, a main CPU 12, a DMA (Direct Memory Access) communication line 13, and an OR circuit 14. The PM-ECU 2 includes a sub-CPU 21, a main CPU 22, a DMA communication line 23, an OR circuit 24, a power source integration IC (Integrated Circuit) 25.

The PLG-ECU 1 is an ECU for detecting the start of the charging mode and notifying the PM-ECU 2. The sub-CPU 11 restores from a sleep state (power-saving operation state) to a normal operation state when a plug for charging (hereinafter, "charging plug") is inserted into an outlet, and executes a process for notifying the PM-ECU 2 of the start of the charging mode.

The sub-CPU 11 determines the insertion or extraction state of the charging plug on the basis of signals input from the charging plug, "SW1" and "PLT". "SW1" is a signal representing the insertion or extraction state of the charging plug (the state in which the charging plug is inserted into or extracted from the outlet). "PLT" is a pilot signal representing the information such as the voltage or the phase of the external power source at the connection destination.

The sub-CPU 11 activates the main CPU 12, which has been in the stopped state, by turning on the IGP relay 4 provided for a power supply line to the main CPU 12, and causes the main CPU 12 to execute the charging process.

Specifically, upon the detection of the start of the charging mode, the sub-CPU 11 outputs a signal "MRL_S" to the OR circuit 14. Upon the input of "MRL_S" to the OR circuit 14, the OR circuit 14 outputs a signal "MRL" to the IGP relay 4, thereby turning on the IGP relay 4. Thus, the power is supplied from the auxiliary battery 3 to the main CPU 12 in the stopped state, thereby activating the main CPU 12. When the IGP relay 4 is turned on, a signal "PIM" is input to the PM-ECU 2.

When the charging mode is started, the main CPU 12 executes the charging process for charging the battery 8 by controlling the charger 7. When the charging process ends, the main CPU 12 works together with the main CPU 22 of the PLG-ECU 2 to execute, for example, a charging mode ending process. The specific operations of the sub-CPU 11 and the main CPU 12 of the PLG-ECU 1 are described later.

The DMA communication line 13 is a communication line used for the communication between the sub-CPU 11 and the main CPU 12. Note that the communication line between the sub-CPU 11 and the main CPU 12 may be other communication line than the DMA communication line 13. In other words, the data transfer between the sub-CPU 11 and the main CPU 12 does not always need to be DMA transfer.

The OR circuit 14 is a logic circuit outputting a signal "MRL" to the IGP relay 4 upon the input of "MRL_S" as an output signal from the sub-CPU 11 or "MRL_M" as an output signal from the main CPU 12.

The PM-ECU 2 is an ECU for executing the charging process and the like in the charging mode or the running mode with the PLG-ECU 1. When the start of the charging mode is notified from the PLG-ECU 1, the sub-CPU 21 of the PM-ECU 2 restores from the sleep state to the normal operation state by turning on "PIM", and activates the main CPU 22 in the stopped state to cause the main CPU 22 to execute the charging process, etc.

Specifically, upon the input of "PIM" from the auxiliary battery 3 via the IGP relay 4, the sub-CPU 21 outputs a signal "PIMD" to the OR circuit 24. Upon the input of "PIMD" to the OR circuit 24, the signal "MRL" is output from the OR circuit 24 to the IGCT relay 6, thereby turning on the IGCT relay 6. Thus, the power is supplied from the auxiliary battery 3 to the main CPU 22 in the stopped state, thereby activating the main CPU 22.

Note that upon the input of a signal "SW2" output on the operation of a power supply switch such as an ignition switch (i.e., when a user gets in a vehicle and turns on the power, mainly when the user is about to start to drive the vehicle), the sub-CPU 21 outputs a signal "IG2D" to the power source integration IC 25.

The main CPU 22 is a CPU for executing the charging process, the charging ending process, etc. with the PLG-ECU 1. For example, when the charging mode is started, the main CPU 22 turns on the system main relay 9 provided between the charger 7 and the battery 8, thereby achieving the state where the charging of the battery 8 is possible.

The main CPU 22 moreover monitors the charging status of the battery 8 and when the charging is completed, orders the main CPU 12 of the PLG-ECU 1 to start the charging mode ending process. The specific operations of the sub-CPU 21 and the main CPU 22 of the PM-ECU 2 are described later in details.

The DMA communication line 23 is a communication line used for the communication between the sub-CPU 21 and the main CPU 22. In a manner similar to the PLG-ECU 1, the communication line used between the sub-CPU 21 and the main CPU 22 may be other communication line than the DMA communication line 23.

The OR circuit 24 is a logic circuit for outputting the signal "MRL" to the IG2 relay 5 upon the input of any of the signal "PIMD" from the sub-CPU 21, the signal "MRL_M" from the main CPU 22, and a signal "IG2" from the IG2 relay 5.

The power source integration IC 25 is an IC for turning on the IG2 relay 5 by outputting the signal "IG2D" to the IG2 relay 5 upon the input of "IG2D" from the sub-CPU 21. By turning on the IG2 relay 5, the signal "IG2" is input to the OR circuit 24. Upon the input of the signal "IG2" to the OR circuit 24, the signal "MRL" is output to the IGCT relay 6 from the OR circuit 24, thereby turning on the IGCT relay 6.

The main CPU 12 of the PLG-ECU 1 and the main CPU 22 of the PM-ECU 2 are connected to each other via a local bus 51, and with this local bus 51, information necessary for the charging mode process, the charging mode ending process, the power supply stopping process, etc. are exchanged. This local bus 51 may be, for example, a CAN bus.

Note that the PLG-ECU 1 and the PM-ECU 2 are also connected to each other via a CAN bus 52. The CAN bus 52 is a CAN bus for connecting the ignition ECUs. The PM-ECU 2 is connected to another ECU via a CAN bus 53, a local bus 54, etc.

The auxiliary battery 3 is a battery mainly used for driving auxiliary units mounted on the vehicle, and provided separately from the battery 8 serving as the main battery used for running the vehicle. The auxiliary battery 3 has lower voltage than the battery 8. The power from the auxiliary battery 3 is normally supplied to the sub-CPU 11 of the PLG-ECU 1 and the sub-CPU 21 of the PM-ECU 2.

Meanwhile, the power from the auxiliary battery 3 is supplied to the main CPU 12 of the PLG-ECU 1 and the main CPU 22 of the PM-ECU 2 via the IGP relay 4 and the IGCT relay 6, respectively. In other words, the main CPU 12 of the PLG-ECU 1 and the main CPU 22 of the PM-ECU 2 are activated when the IGP relay 4 and the IGCT relay 6 are turned on, respectively.

The IGP relay 4 is a relay circuit provided between the main CPU 12 of the PLG-ECU 1 and the auxiliary battery 3. The IGP relay 4 is turned on by the input of "MRL" from the OR circuit 14 of the PLG-ECU 1.

The IG2 relay 5 is a relay circuit provided between the main CPU 22 of the PM-ECU 2 and the auxiliary battery 3. This IG2 relay 5 is turned on by the input of "IG2D" via the power source integration IC 25 from the sub-CPU 21 when SW2 becomes the ON state. Note that the IG2 relay 5 is a relay connected when a user gets in the vehicle and turns on the power.

In a manner similar to the IG2 relay 5, the IGCT relay 6 is also a relay circuit provided between the main CPU 22 of the PM-ECU 2 and the auxiliary battery 3. This IGCT relay 6 is turned on by the input of "MRL" from the OR circuit 24 of the PM-ECU 2.

The charger 7 is a charger for charging the battery 8. The battery 8 is a cell (battery) for storing electricity supplied from an external power source via the charger 7 and the system main relay 9. The system main relay 9 is a relay circuit provided between the charger 7 and the battery 8, and the ON/OFF thereof is controlled by the main CPU 22 of the PM-ECU 2.

Figure 3:
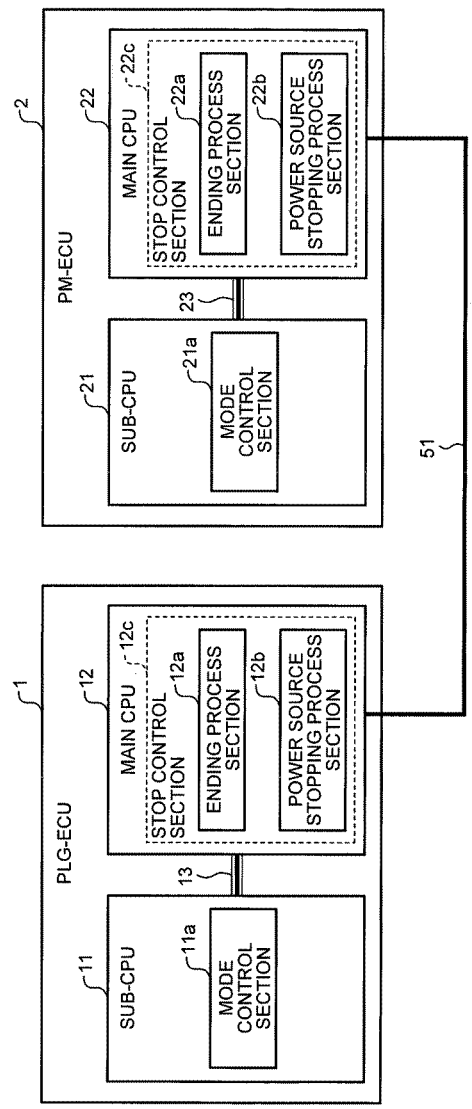
FIG. 3 is a block diagram depicting configurations of a PLG-ECU and a PM-ECU.

Next, the configuration of the PLG-ECU 1 and the PM-ECU 2 is described. FIG. 3 is a block diagram depicting the configuration of the PLG-ECU 1 and the PM-ECU 2.

As depicted in FIG. 3, the sub-CPU 11 of the PLG-ECU 1 includes a mode control section 11a and the main CPU 12 includes a stop control section 12c. The stop control section 12c includes an ending process section 12a and a power source stopping process section 12b.

On the other hand, the sub-CPU 21 of the PM-ECU 2 includes a mode control section 21a and the main CPU 22 thereof includes a stop control section 22c. The stop control section 22c includes an ending process section 22a and a power source stopping process section 22b.

The mode control section 11a of the PLG-ECU 1 becomes the mode undefined state at the time of restoration from the reset state and if a predetermined transition condition for allowing the transition into the operation mode is satisfied when in the mode undefined state, the mode control section 11a of the PLG-ECU 1 transits the operation mode into the operation mode whose transition condition has been satisfied. Specifically, the mode control section 11a turns off "IGP signal" for turning off the IGP relay 4 connected during the operation of the charging mode, if the main CPU 22 of the PM-ECU 2 orders to start the charging mode ending process.

If, in a predetermined operation mode, a condition for ending the operation mode is satisfied, the stop control section 12c of the PLG-ECU 1 performs the stop control for having the control system in the low-power-consumption state while communicating with the other control unit, the PM-ECU 2, and includes the ending process section 12a and the power source stopping process section 12b.

The ending process section 12a is a process section for executing the charging mode ending process in cooperation with the ending process section 22a of the PM-ECU 2. The ending process section 12a, when the procedure included in the charging mode ending process has been completed up to the charging ending process, transmits "PLG-side power holding request" OFF, which represents the completion of the charging ending process, to the PM-ECU 2. By the reception of "PLG-side power holding request" OFF, the PM-ECU 2 can recognize that the PLG-ECU 1 has completed the charging process. Note that the specific procedure of the charging mode ending process is described later with reference to FIG. 4A.

If the stop of the power supply is permitted by the power source stopping process section 22b of the PM-ECU 2, the power source stopping process section 12b of the PLG-ECU 1 performs the power source stopping process for stopping the power supply to the own unit. Specifically, the power source stopping process section 12b performs the power source stopping, process when having received "MRL holding and integrating result" OFF, which is described later, from the power source stopping process section 22b of the PM-ECU 2.

In a manner similar to the mode control section 11a of the PLG-ECU 1, the mode control section 21a of the PM-ECU 2 becomes the mode undefined state when restored from the reset state and if, in the mode undefined state, a predetermined transition condition for allowing the transition into the operation mode is satisfied, transits the operation mode into the operation mode whose transition condition has been satisfied. The mode control section 21a transits the operation mode to the charging mode when the IGP signal (first power source signal) as a signal for controlling the connection state of the IGP relay 4 (first power source route) for supplying power to the PLG-ECU 1 during the charging mode is detected to be in the ON state that requests for the connected state.

If, in a predetermined operation mode, the condition for ending the operation mode is satisfied, the stop control section 22c of the PM-ECU 2 performs the stop control for having the control system in a low-power-consumption state while communicating with the other control unit, the PLG-ECU 1. The stop control section 22c includes the ending process section 22a and the power source stopping process section 22b.

The ending process section 22a is a process section for executing the charging mode ending process between the ending process section 22a and the ending process section 12a of the PLG-ECU 1. The power source stopping process section 22b is a process section for performing the power source stopping process in which the stop of power supply to the PLG-ECU 1 is permitted when the procedure of the charging mode ending process has been completed up to the charging ending process and moreover when "PLG-side power holding request" OFF has been received from the PLG-ECU 1.

In particular, the power source stopping process section 22b forcibly performs the power source stopping process when the state in which all signals of "IGP signal" as a mode signal corresponding to the charging mode and "IG2" as a mode signal corresponding to the running mode are OFF has continued for a predetermined period. This point will be described later with reference to FIG. 6.

Next, with reference to FIG. 4A, the description is made of an example in which the charging mode ending process is normally performed. FIG. 4A is a sequence diagram depicting an example in which the charging mode ending process is normally performed.

Note that at the start of the charging mode ending process, the main CPU 12 of the PLG-ECU 1 and the main CPU 22 of the PM-ECU 2 are in an active state (the power consumption is larger than that in the low-power-consumption state). In other words, "MRL_S" and "MRL_M" are output to the OR circuit 14 from the sub-CPU 11 and the main CPU 12 of the PLG-ECU 1, respectively, thereby having the IGP relay 4 in the ON state. Moreover, "PIMD" and "MRL_M" are output to the OR circuit 24 from the sub-CPU 21 and the main CPU 22 of the PM-ECU 2, respectively, thereby having the IGCT relay 6 in the ON state. The IG2 relay 5 is controlled to be in the OFF state.

As depicted in FIG. 4A, when it is determined that the charging of the battery 8 has been completed (Step S11), the main CPU 22 of the PM-ECU 2 turns on "IGP off request" (Step S12). Thus, during the stop control, the stop control section 22c is made in the OFF state requesting the IGP relay 4 to be in the disconnected state. The main CPU 22 of the PM-ECU 2 transmits "IGP off request" ON to the main CPU 12 of the PLG-ECU 1 via the local bus 51 (Step S13).

Subsequently, upon the reception of "IGP off request" ON from the PM-ECU 2 via the local bus 51, the main CPU 12 of the PLG-ECU 1 transmits "IGP off request" ON to the sub-CPU 11 via the DMA communication line 13 (Step S14). Upon the reception of "IGP off request" ON, the sub-CPU 11 of the PLG-ECU 1 turns off "MRL_S" (Step S16) in addition to turning off "IGP signal" as the mode signal corresponding to the charging mode (Step S15). Further, the sub-CPU 11 transmits "IGP signal" OFF to the main CPU 12 (Step S17).

As depicted in FIG. 2, even though "MRL_S" is turned off, the IGP relay 4 is not turned off here because "MRL_M" is input from the main CPU 12 to the OR circuit 14 of the PLG-ECU 1.

Upon the reception of "IGP signal" OFF from the sub-CPU 11, the main CPU 12 of the PLG-ECU 1 transmits "IGP signal" OFF to the main CPU 22 of the PM-ECU 2 via the local bus 51 (Step S18).

Upon the reception of "IGP signal" OFF from the main CPU 12 of the PLG-ECU 1, the main CPU 22 of the PM-ECU 2 starts the charging ending process (Step S19). After the transmission of "IGP signal" OFF to the main CPU 22 of the PM-ECU 2, the main CPU 12 of the PLG-ECU 1 also starts the charging ending process (Step S20).

Subsequently, upon the completion of the charging ending process, the main CPU 22 of the PM-ECU 2 turns off "PM-side power holding request" (Step S21). Upon the completion of the charging ending process, the main CPU 12 of the PLG-ECU 1 turns off "PLG-side power holding request" (Step S22) and then transmits "PLG-side power holding request" OFF to the main CPU 22 of the PM-ECU 2 (Step S23). Upon the turning off of "PM-side power holding request" and the reception of "PLG-side power holding request" OFF from the PLG-ECU 1, the main CPU 22 of the PM-ECU 2 turns off "MRL holding and integrating result" (Step S24). By turning off this "MRL holding and integrating result", the transition into the power supply stopping process becomes possible.

Although the example has been described in which the main CPU 22 of the PM-ECU 2 receives "PLG-side power holding request" OFF from the PLG-ECU 1 after "PM-side power holding request" is turned off, the present invention is not limited thereto. In other words, the main CPU 22 of the PM-ECU 2 may receive "PLG-side power holding request" OFF from the PLG-ECU 1 before "PM-side power holding request" is turned off.

Next, with reference to FIG. 4B, the description is made of an example in which the power supply stopping process is normally performed. FIG. 4B is a sequence diagram depicting the example in which the power supply stopping process is normally performed. The power supply stopping process is executed subsequent to the charging mode ending process depicted in FIG. 4A.

As depicted in FIG. 4B, the main CPU 22 of the PM-ECU 2 transmits "MRL holding and integrating result" OFF to the main CPU 12 of the PLG-ECU 1 via the local bus 51 (Step S31). Upon the reception of "MRL holding and integrating result" OFF, the main CPU 12 of the PLG-ECU 1 turns off "MRL_M" (Step S32).

After the transmission of "MRL holding and integrating result" OFF to the PLG-ECU 1, the main CPU 22 of the PM-ECU 2 stops the local bus 51 (Step S33). Similarly, after turning off "MRL_M", the main CPU 12 of the PLG-ECU 1 stops the local bus 51 (Step S34). This results in the state in which the communication between the PLG-ECU 1 and the PM-ECU 2 is disconnected.

When "MRL_M" has been turned off by the main CPU 12 of the PLG-ECU 1 (See S001 of FIG. 4B), both "MRL_S" and "MRL_M" are made in the OFF state; therefore, the signal "MRL" from the OR circuit 14 is turned off and the IGP relay 4 is turned off. As a result, the amount of power supply to the main CPU 12 of the PLG-ECU 1 is decreased (See S002 of FIG. 4B). When the power supply to the main CPU 12 of the PLG-ECU 1 is stopped, the main CPU 12 stops (see S003 of FIG. 4B). If the stop of the main CPU 12 has been determined by a method of, for example, detecting the voltage drop in a route via the IGP relay 4, the sub-CPU 11 transits to the sleep state (low-power-consumption state) (Step S35).

Meanwhile, if the IGP relay 4 is turned off to stop the power supply to the main CPU 12 of the PLG-ECU 1, "PIM" is turned off (see S004 of FIG. 4B). When the turning off of "PIM" has been detected, the sub-CPU 21 of the PM-ECU 2 turns off "PIMD" (Step S36) and the main CPU 22 turns off "MRL_M" (Step S37).

If "PIMD" and "MRL_M" are both turned off, "MRL" from the OR circuit 24 is turned off and the IGCT relay 6 is turned off because "IG2" is originally in the OFF state. As a result, the amount of power supply to the main CPU 22 of the PM-ECU 2 is decreased (see S005 of FIG. 4B). When the power supply to the main CPU 22 of the PM-ECU 2 is stopped, the main CPU 22 stops (see S006 of FIG. 4B). When the stop of the main CPU 22 has been determined by a method of, for example, detecting the voltage drop in a route via the IGCT relay 6, the sub-CPU 21 transits to the sleep state (Step S38).

Thus, the timing of turning off the power is synchronized in the PLG-ECU 1 and the PM-ECU 2 by performing the charging mode ending process and the power supply stopping process in cooperation. This is because, if one ECU stops the power supply based on its own determination, the other ECU may determine, by mistake, that abnormality has occurred in the local bus 51. Further, if the power is turned off without the two ECUs synchronizing with each other, the transition into the power-OFF state may be failed because such a process is repeated as that after one ECU gets in the power-OFF state, the ECU starts up by erroneously determining the request for activation from the other ECU.

Figure 5:
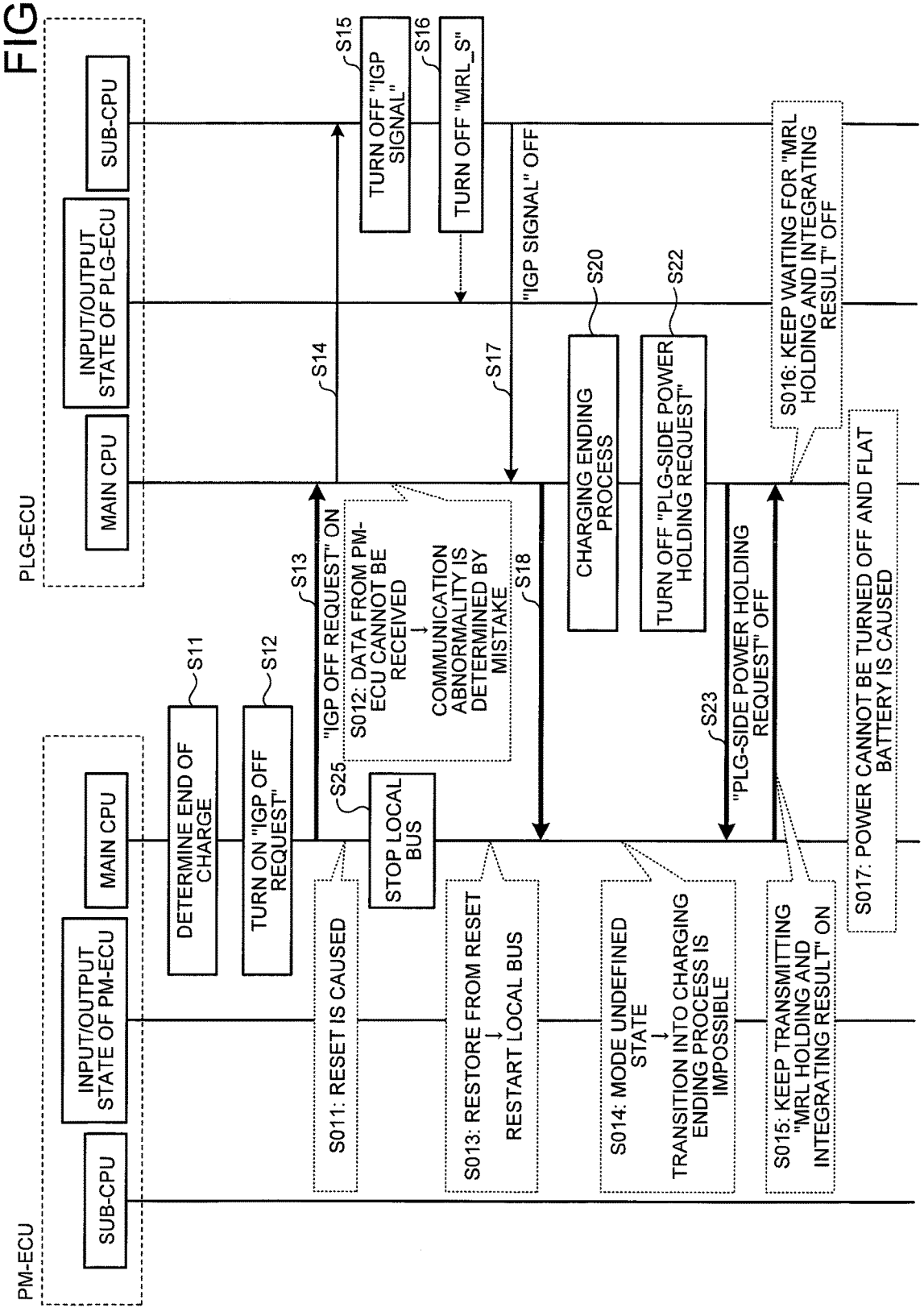
FIG. 5 is a sequence diagram depicting a conventional example in which reset is caused in the PM-ECU during the charging mode ending process.

However, in the conventional technique, if the reset is caused in any ECU, the process advanced in synchronization may face a trouble, in which case the turning off the power may be failed. Here, as one example, the description is made of the conventional example in which the reset is caused in the PM-ECU during the charging mode ending process, with reference to FIG. 5. FIG. 5 is a sequence diagram depicting the conventional example in which the reset is caused in the PM-ECU during the charging mode ending process.

It is assumed that, as depicted in FIG. 5, after the transmission of "IGP off request" ON to the main CPU of the PLG-ECU (Step S13), the reset is caused in the main CPU of the PM-ECU (see S011 of FIG. 5). In this case, the main CPU of the PM-ECU stops the local bus (Step S25). By the stop of the local bus, the main CPU of the PLG-ECU can no longer receive data from the PM-ECU, and erroneously determines the communication abnormality (see S012 of FIG. 5).

After that, the main CPU of the PM-ECU restores from the reset state and restarts the local bus (see S013 of FIG. 5). On this occasion, "IGP signal" is turned off by the sub-CPU of the PLG-ECU (Step S15) and "IG2" as the mode signal corresponding to the running mode is also in the OFF state. Therefore, the main CPU of the PM-ECU becomes the undefined state in which the current operation mode is unclear between the charging mode and the running mode, i.e., the mode undefined state, and the transition into the charging ending process to be performed later becomes impossible (see S014 of FIG. 5).

Thus, the main CPU of the PM-ECU cannot turn off "PM-side power holding request"; therefore, even if "PLG-side power holding request" OFF is received from the main CPU of the PLG-ECU, "MRL holding and integrating result" ON is transmitted continuously (see S015 of FIG. 5). Along with this, the main CPU of the PLG-ECU keeps waiting for the transmission of "MRL holding and integrating result" OFF from the main CPU of the PM-ECU (see S016 of FIG. 5). As a result, the PLG-ECU and the PM-ECU cannot turn off the power, thereby causing a possibility of the flat battery of the auxiliary battery (see S017 of FIG. 5).

In the conventional technique, in this manner, in the occurrence of the reset in the PM-ECU during the charging mode ending process, there may be caused a situation where the power cannot be turned off.

Note that the default mode of the CPU (here, the main CPU 22 of the PM-ECU 2) at the restoration from the reset state is set to the mode unidentified (mode undefined state), and that the condition for allowing, after the restoration from the reset state, the transition from the mode undefined state to a predetermined operation mode (charging mode and running mode) is not satisfied is given as one cause of the continuation of the mode undefined state. Similarly, another cause of the continuation of the mode undefined state is that the transition into the ending process (charging ending process) for the transition into the power-OFF state (sleep state) is not allowed before the transition into a predetermined operation mode (charging mode and running mode) is carried out once (if the state is in the mode undefined state).

The condition for allowing the transition into the charging mode is "reception of IGP signal ON" or "detection of IGP ON", and the condition for allowing the transition into the running mode is "reception of IG2 signal ON" or "detection of IG2 ON". The IGP signal is in the ON state during the connection of, mainly, the charging plug (if the input of SW1 becomes the connected state), and the IG2 signal is in the ON state when the IG switch becomes ON (if the input of SW2 becomes the ON state).

As one cause of the continuation of the OFF state of the IGP signal (not receiving the IGP signal ON), the transmission of the IGP signal OFF via the CAN communication from the sub CPU 21 of the PLG-ECU 1 because the IGP signal is OFF due to the ending process of the PLG-ECU 1 performed after the restoration from the reset state of the main CPU 22 of the PM-ECU 2 is given.

Figure 6:
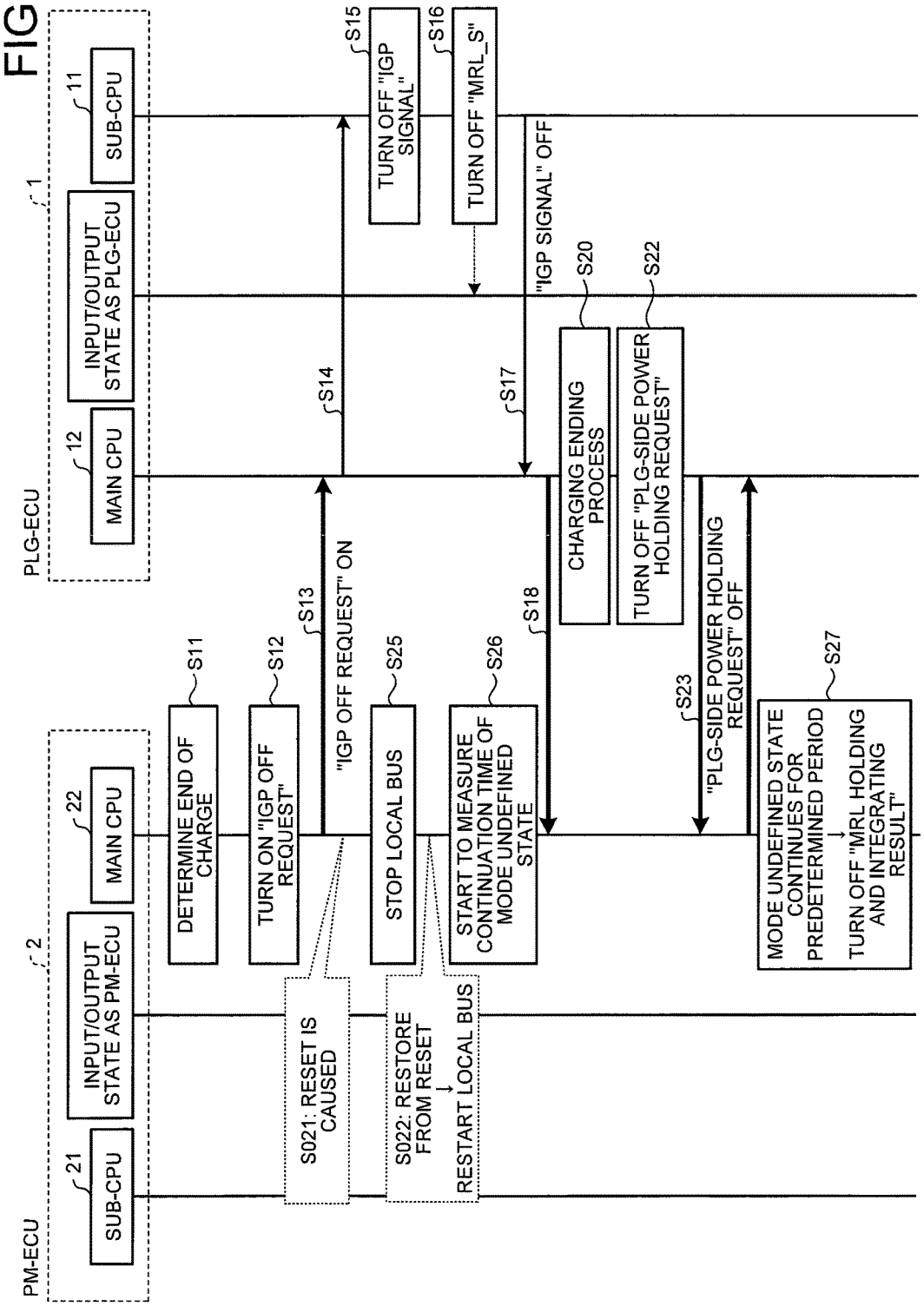
FIG. 6 is a sequence diagram depicting an example in which reset is caused in the PM-ECU during the charging mode ending process in a control system according to Embodiment.

In view of this, in the control system 100 according to Embodiment, the time-out process is performed between the charging mode ending process and the power supply stopping process, thereby avoiding the situation where the power cannot be turned off. This time-out process is specifically described with reference to FIG. 6. FIG. 6 is a sequence diagram depicting the example in which the reset is caused in the PM-ECU 2 during the charging mode ending process in the control system 100 according to Embodiment.

In a manner similar to FIG. 5, FIG. 6 illustrates the example in which after the transmission of "IGP off request" ON to the main CPU 12 of the PLG-ECU 1 (Step S13), the reset is caused in the main CPU 22 of the PM-ECU 2 (see S021 of FIG. 6).

As depicted in FIG. 6, as soon as the main CPU 22 of the PM-ECU 2 is restored from the reset state and restarts the local bus 51 (see S022 of FIG. 6), the main CPU 22 starts to measure the time for which the mode undefined state continues (Step S26). Specifically, the time for which the mode undefined state continues refers to the time for which the state where "IGP signal" as the mode signal corresponding to the charging mode and "IG2" corresponding to the running mode are both OFF continues. Here, the timing for starting the measurement is just after the restart of the local bus 51; however, the timing may be just after the restoration from the reset state.

Then, after the mode undefined state continues for a predetermined period, the stop control section 22c of the PM-ECU 2 forcibly turns off "MRL holding and integrating result" even though "PM-side power holding request" is not turned off (Step S27). As a result, the state in which "MRL holding and integrating result" ON is continuously transmitted (see S015 of FIG. 5) and the state in which "MRL holding and integrating result" OFF is continuously awaited (see S016 of FIG. 5) are solved. This allows the PLG-ECU 1 and the PM-ECU 2 to transit into the power supply stopping process of FIG. 4B.

Note that, in Embodiment, the main CPU 22 of the PM-ECU 2 turns off "MRL holding and integrating result" regardless of whether "PLG-side power holding request" OFF is received from the main CPU 22 of the PLG-ECU 1 or not; however, the present invention is not limited thereto.

For example, if the OFF state of "IGP signal" and "IG2" continues for a predetermined period and if "PLG-side power holding request" OFF is received from the main CPU 12 of the PLG-ECU 1, the main CPU 22 of the PM-ECU 2 may turn off "MRL holding and integrating result". In this case, it is possible to avoid the situation where the power is turned off by mistake when the power source should not be turned off.

Figure 7:
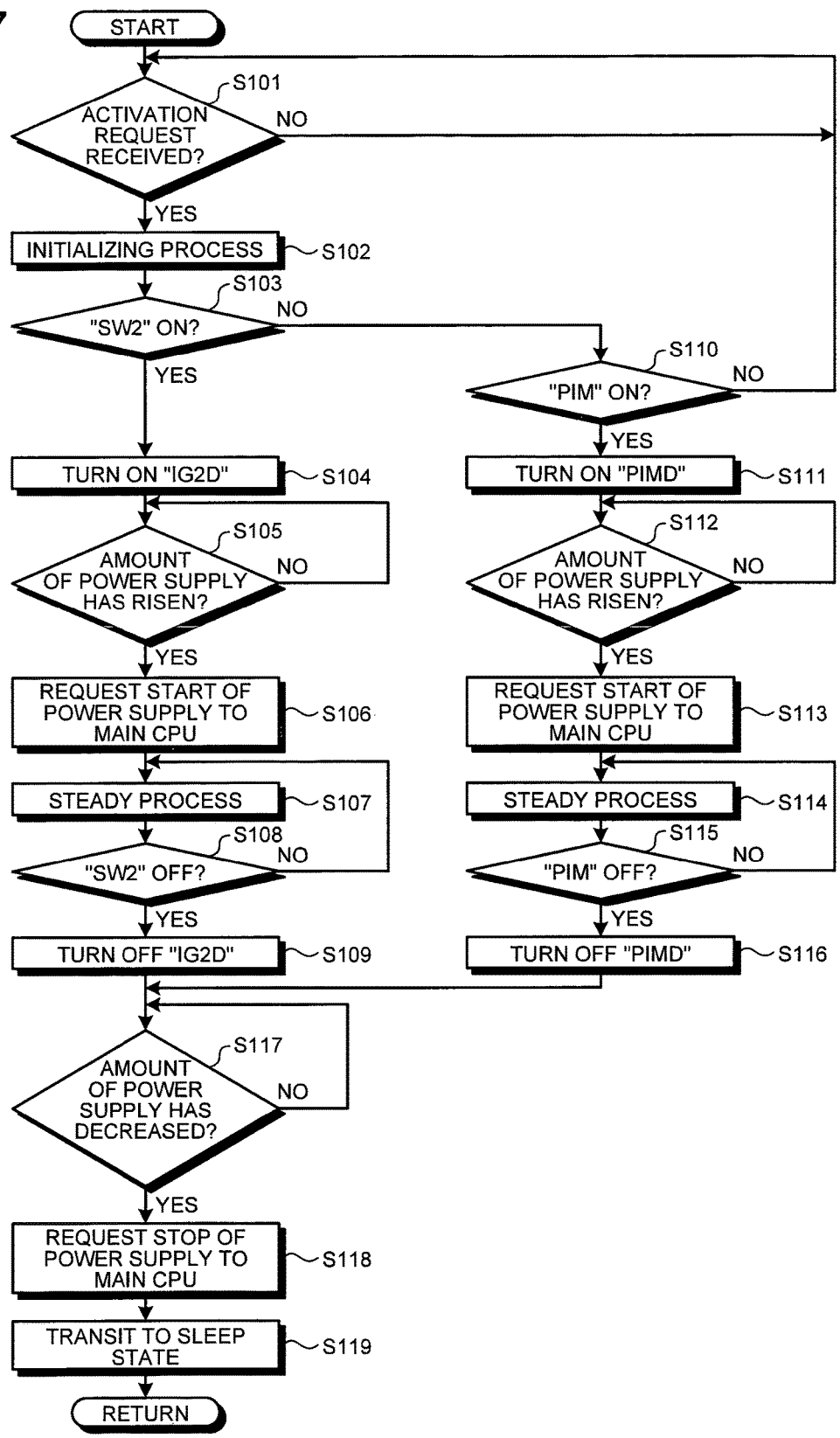
FIG. 7 is a flowchart depicting the procedure of the process executed by a sub-CPU of the PM-ECU.

Next, the specific operation of the sub-CPU 21 of the PM-ECU 2 is described with reference to FIG. 7. FIG. 7 is a flowchart depicting a procedure to be executed by the sub-CPU 21 of the PM-ECU 2.

As depicted in FIG. 7, the sub-CPU 21 determines whether the activation request has been received or not (Step S101) when in the power-OFF state or in the sleep state, and if it is determined that the activation request has been received (Yes in Step S101), the initializing process is executed (Step S102).

Here, the determination on whether the activation request has been received or not is made based on whether "SW2" or "PIM" is turned on or not. "SW2" is a signal output when, for example, an ignition button is pressed. "PIM" is a signal input from the auxiliary battery 3 into the sub-CPU 21 via the IGP relay 4, i.e., input when the PLG-ECU 1 is activated.

The sub-CPU 21 determines that the activation request has been received when one of "SW2" and "PIM" is turned on. If there is no activation request (No in Step S101), the sub-CPU 21 repeats the determination process of Step S101 until the activation request is received.

After the initializing process, the sub-CPU 21 determines whether "SW2" is turned on or not (Step S103); if "SW2" is determined to be turned on (Yes in Step S103), "IG2D" is turned on (Step S104). This "IG2D" is output to the power source integration IC 25.

Note that upon the input of "IG2D" into the power source integration IC 25, the power source integration IC 25 turns on the IG2 relay 5. Thus, "IG2" is input to the OR circuit 24, and when the OR circuit 24 outputs "MRL", the IGCT relay 6 is turned on.

Subsequently, the sub-CPU 21 determines whether the amount of power supplied from the auxiliary battery 3 via the IGCT relay 6 has risen up to a predetermined level (Step S105). If the sub-CPU 21 has determined the rise of the power source up to the predetermined level (Yes in Step S105), "PCTL" is output to the power source integration IC 25, thereby requesting the start of power supply to the main CPU 22 from the power source integration IC 25 (Step S106). Thus, the power supply to the main CPU 22 is started. Note that if the amount of the power supply has not risen up to the predetermined level (No in Step S105), the sub-CPU 21 repeats the determination process of Step S105 until the power supply reaches the predetermined level.

Subsequently, the sub-CPU 21 executes the steady process such as monitoring the main CPU 22 or managing the power source (Step S107). The sub-CPU 21 determines whether "SW2" has been turned off or not (Step S108), and if "SW2" has not been turned off (No in Step S108), the steady process of Step S107 is repeated. If it is determined that "SW2" has been turned off (Yes in Step S108), the sub-CPU 21 turns off "IG2D" (Step S109).

When "IG2D" is turned off, the power source integration IC 25 turns off the output of "IG2D" relative to the IG2 relay 5, thereby turning off the IG2 relay 5.

On the other hand, if "SW2" has not been turned on in Step S103 (No in Step S103), the sub-CPU 21 determines whether "PIM" has been turned on or not (Step S110). If it is determined that "PIM" has been turned on (Yes in Step S110), the sub-CPU 21 turns on "PIMD" (Step S111).

When "PIMD" is turned on, the OR circuit 24 turns on the IGCT relay 6. If "PIM" has not been turned on in Step S110

(No in Step S110), the sub-CPU 21 returns the process to Step S101 and repeats the process from Step S101 to Step S110.

When "PIMD" is turned on, the sub-CPU 21 determines whether the power supplied from the auxiliary battery 3 via the IGCT relay 6 has risen to a predetermined level (Step S112). Then, if it is determined that the amount of power supply has risen to the predetermined level (Yes in Step S112), the sub-CPU 21 outputs "PCTL" to the power source integration IC 25, thereby requesting the start of the power supply to the main CPU 22 from the power source integration IC 25 (Step S113). Thus, the power supply to the main CPU 22 is started. If the amount of power supply has not risen to the predetermined level (No in Step S112), the sub-CPU 21 repeats the determination process of Step S112 until the amount of power supply reaches the predetermined level.

Then, the sub-CPU 21 executes the steady process such as monitoring the main CPU 22 or managing the power source (Step S114). The sub-CPU 21 determines whether "PIM" has been turned off or not (Step S115), and if "PIM" has not been turned off (No in Step S115), the steady process of Step S114 is repeated. If it is determined that "PIM" has been turned off (Yes in Step S115), the sub-CPU 21 turns off "PIMD" (Step S116).

After the process of Step S109 or Step S116, the sub-CPU 21 determines whether the amount of power supplied from the auxiliary battery 3 via the IGCT relay 6 has decreased down to a predetermined level (Step S117). If it is determined that the amount of power supply has decreased down to the predetermined level (Yes in Step S117), the sub-CPU 21 requests the power source integration IC 25 to stop the power supply to the main CPU 22 by turning off the output of "PCTL" to the power source integration IC 25 (Step S118). Thus, the power supply to the main CPU 22 is stopped. If the amount of power supply has not decreased down to the predetermined level (No in Step S117), the sub-CPU 21 repeats the determination process of Step S117 until the amount of power supply reaches the predetermined level.

After the request for stopping the power supply to the main CPU 22 is made, the sub-CPU 21 transits to the sleep state (Step S119) and ends the process.

Figure 8:
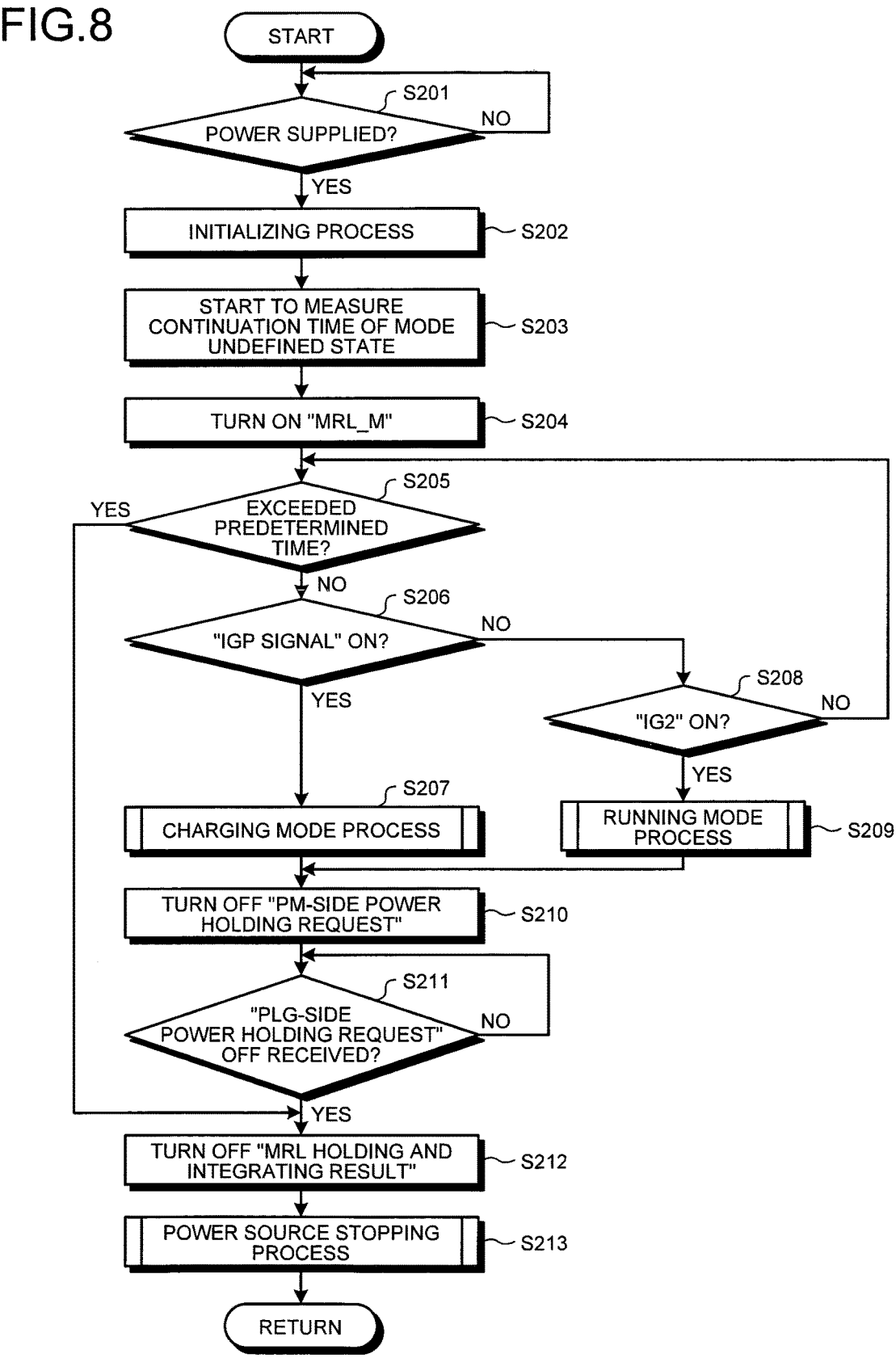
FIG. 8 is a flowchart depicting the procedure of the process executed by a main CPU of the PM-ECU.

Next, the specific operation of the main CPU 22 of the PM-ECU 2 is described with reference to FIG. 8. FIG. 8 is a flowchart of a procedure of the process executed by the main CPU 22 of the PM-ECU 2.

As depicted in FIG. 8, the main CPU 22 determines whether the power has been supplied or not (Step S201), and if the power has been supplied (Yes in Step S201), the initializing process is executed (Step S202). If the power has not been supplied (No in Step S201), the main CPU 22 repeats the process of Step S201 until the power is supplied.

After the initializing process is completed, the time for which the mode undefined state continues starts to be measured (Step S203).

Subsequently, the main CPU 22 turns on "MRL_M" (Step S204). By turning on "MRL_M", the ON state of the IGCT relay 6 is maintained even though "PIMD" or "IG2" is turned off. Thus, "MRL_M" is a signal for self-holding the power supply to the main CPU 22.

Subsequently, the main CPU 22 determines whether a predetermined period has passed from the start of the measurement of the continuation time of the mode undefined state (Step S205). On this occasion, if the predetermined period has not passed from the start of the measurement (No in Step S205), the main CPU 22 determines whether "IGP signal" has been turned on or not (Step S206). "IGP signal" is a mode signal corresponding to the charging mode, and its ON/OFF is controlled by the mode control section 11a of the sub-CPU 11 of the PLG-ECU 1.

If it is determined that "IGP signal" has been turned on in Step S206 (Yes in Step S206), the main CPU 22 executes the charging mode process (Step S207). The specific content of the charging mode process is specifically described later with reference to FIG. 9A.

Meanwhile, if "IGP signal" has not been turned on in Step S206 (No in Step S206), the main CPU 22 determines whether "IG2" has been turned on or not (Step S208). "IG2" is a mode signal corresponding to the running mode.

If it is determined that "IG2" has been turned on in Step S208 (Yes in Step S208), the main CPU 22 executes the running mode process (Step S209). This running mode process will be described in detail with reference to FIG. 9B.

After the charging Mode process or the running mode process, the main CPU 22 turns off "PM-side power holding request" (Step S210), and determines whether "PLG-side power holding request" OFF has been received or not from the PLG-ECU 1 (Step S211). The main CPU 22 repeats the determination process of Step S211 if "PLG-side power holding request" OFF has not been received (No in Step S211).

Then, if it is determined that "PLG-side power holding request" OFF has been received (Yes in Step S211), the main CPU 22 turns off "MRL holding and integrating result" (Step S212) and executes the power source stopping process (Step S213), thereby ending the process. This power source stopping process will be described in detail with reference to FIG. 9C.

If "IG2" has not been turned on in Step S208 (No in Step S208), the main CPU 22 returns the process to Step S205 and repeats the process of Steps S205 to S208.

Here, if the reset is caused in the main CPU 22 during the charging mode ending process, for example, the main CPU 22 restored from the reset state restarts the process from the initializing process of Step S202. On this occasion, "IGP signal" is in the OFF state due to the sub-CPU 11 of the PLG-ECU 1 (see Step S15 of FIG. 4A); therefore, the main CPU 22 repeats the process of Steps S205 to S208. In the conventional technique, once this state is produced, the power cannot be turned off, in which case the flat battery may be caused.

However, in Embodiment, the continuation time of the mode undefined state exceeds the predetermined period while the process of Steps S205 to S208 is repeated. If it is determined that the continuation time of the mode undefined state has exceeded the predetermined period (Yes in Step S205), the main CPU 22 advances the process to Step S212 to turn off "MRL holding and integrating result".

In this manner, even though the state is the mode undefined state, the main CPU 22 can forcibly turn off "MRL holding and integrating result" by the time-out process. This can avoid the situation in which the power cannot be turned off.

Next, the procedure of the charging mode process is described with reference to FIG. 9A. FIG. 9A is a flowchart depicting the procedure of the charging mode process executed by the main CPU 22 of the PM-ECU 2.

As depicted in FIG. 9A, upon the start of the charging mode process, the main CPU 22 performs the charging mode setting (Step S301) to start the charging process (Step S302). Subsequently, the main CPU 22 determines whether "charging ending request" has been received or not (Step S303). In the case where the charging of the battery 8 is completed or the request for ending the charging process is received from the PLG-ECU 1, the main CPU 22 determines that "charging ending request" has been received.

If it is determined that "charging ending request" has been received (Yes in Step S303), the main CPU 22 turns on "IGP off request" and transmits "IGP off request" ON to the PLG-ECU 1 (Step S304). If "charging ending request" has not been received in Step S303 (No in Step S303), the main CPU 22 returns the process to Step S302 and performs the charging process until "charging ending request" is received.

After the process of Step S304, the main CPU 22 determines whether "IGP signal" OFF has been received from the PLG-ECU 1 (Step S305). If it is determined that "IGP signal" OFF has been received (Yes in Step S305), the main CPU 22 performs the charging ending process (Step S306), thereby ending the process. Note that if "IGP signal" OFF has not been received (No in Step S305), the main CPU 22 repeats the determination process of Step S305 until "IGP signal" OFF is received.

Figure 9B:
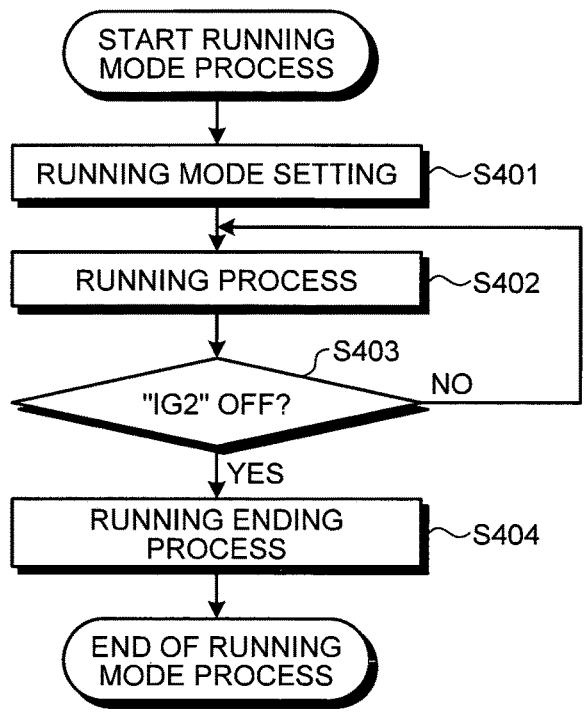
FIG. 9B is a flowchart depicting the procedure of the running mode process executed by the main CPU of the PM-ECU.

Next, the procedure of the running mode process is described with reference to FIG. 9B. FIG. 9B is a flowchart depicting the procedure of the running mode process executed by the main CPU 22 of the PM-ECU 2.

As depicted in FIG. 9B, upon the start of the running mode process, the main CPU 22 performs the running mode setting (Step S401), thereby starting the running process (Step S402).

Subsequently, the main CPU 22 determines whether "IG2" has been turned off or not (Step S403), and if it is determined that "IG2" has been turned off (Yes in Step S403), the main CPU 22 performs the running ending process (Step S404), thereby ending the process. If "IG2" has not been turned off (No in Step S403), the main CPU 22 returns the process to Step S402 and repeats the process of Step S402 and Step S403 until "IG2" is turned off.

Figure 9C:
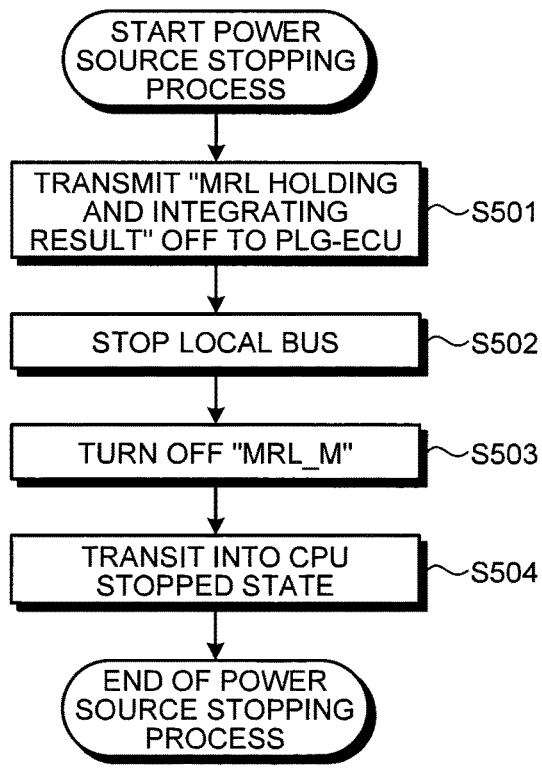
FIG. 9C is a flowchart depicting the procedure of the power source stopping process executed by the main CPU of the PM-ECU.

Next, the power source stopping process will be described in detail with reference to FIG. 9C. FIG. 9C is a flowchart depicting the procedure of the power source stopping process executed by the main CPU 22 of the PM-ECU 2.

As depicted in FIG. 9C, upon the start of the power source stopping process, the main CPU 22 transmits "MRL holding and integrating result" OFF to the PLG-ECU 1 (Step S501), thereby stopping the local bus 51 (Step S502). After "MRL_M" is turned off (Step S503), the main CPU 22 transits to the CPU stopped state (Step S504) and ends the process.

Thus, in Embodiment, at least one control unit of the PLG-ECU and the PM-ECU has the stop control section and the mode control section. The stop control section performs, if a condition for ending a predetermined operation mode is satisfied in that operation mode, the stop control for having the control system in the low-power-consumption state while communicating with the other control unit. The mode control section makes the mode undefined state in which the operation mode is instable at the restoration from the reset state, and if a predetermined transition condition for allowing transition into the operation mode is satisfied in the mode undefined state, transits the operation mode into the operation mode whose transition condition has been satisfied. The stop control section also performs the stop control also when the mode undefined state has continued for a predetermined period.

Specifically, in Embodiment, the PLG-ECU 1 includes the mode control section 11a and the stop control section 12c. The mode control section 11a, if ordered by the PM-ECU2 to start the charging mode ending process, turns off the mode signal "IGP signal" representing that the current operation mode is the charging mode. When the charging mode ending process is completed up to the predetermined procedure (charging process), the ending process section 12a of the stop control section 12c transmits the completion notification "PLG-side power holding request" OFF representing the completion up to the charging process, to the PM-ECU 2.

Further, in Embodiment, the PM-ECU 2 includes the stop control section 22c. When the charging mode ending process has been completed up to the predetermined procedure (charging process) and moreover when "PLG-side power holding request" OFF has been received from the PLG-ECU 1, the power source stopping process section 22b of the stop control section 22c performs the power source stopping process for permitting the stop of the power supply to the PLG-ECU 1.

Then, in Embodiment, when the state in which all of the mode signal "IGP signal" corresponding to the charging mode and the mode signal "IG2" corresponding to the running mode are OFF has continued for the predetermined time, the power source stopping process section 22b forcibly performs the power source stopping process. Specifically, the passage time is measured from the transition into the initial state corresponding to the state just after the power input, and if the state in which both "IGP signal" and "IG2" are OFF has continued until the passage time exceeds the predetermined time, the power source stopping process section 22b forcibly performs the power source stopping process.

Therefore, according to Embodiment, it is possible to avoid the situation in which the power cannot be turned off.

By the way, the description has been made of the example in which the reset is caused in the PM-ECU 2 during the charging mode ending process. However, in the control system 100 according to Embodiment, it is possible to avoid the situation in which the power cannot be turned off even in the occurrence of the reset in the PLG-ECU 1 during the process of stopping the power supply. An example is described below in which the reset is caused in the PLG-ECU 1 during the process of stopping the power supply.

First, with reference to FIG. 10, a conventional example is described in which the reset is caused in the PLG-ECU during the process of stopping the power supply. FIG. 10 is a sequence diagram depicting the conventional example in which the reset is caused in the PLG-ECU during the process of stopping the power supply.

As depicted in FIG. 10, for example, it is assumed that just after the start of the process of stopping the power supply, specifically, after the transmission of "PLG-side power holding request" OFF to the PM-ECU, the reset is caused in the main CPU of the PLG-ECU (see S031 in FIG. 10).

In this case, the main CPU of the PLG-ECU stops the local bus (Step S40). After that, "MRL holding and integrating result" OFF is transmitted from the PM-ECU (Step S31); however, since the local bus is stopped, the main CPU of the PLG-ECU cannot receive "MRL holding and integrating result" OFF (see S032 in FIG. 10).

After that, the main CPU of the PLG-ECU restores from the reset state and restarts the local bus (see S033 in FIG. 10). On this occasion, "IGP signal" corresponding to the charging mode and "IG2" corresponding to the running mode are both in the OFF state; therefore, the main CPU of the PLG-ECU is in the mode undefined state. Thus, the main CPU of the PLG-ECU cannot transit into the process of stopping the power supply and cannot turn off "MRL_M" (see S034 in FIG. 10).

If "MRL_M" cannot be turned off, the output of "MRL" to the IGP relay from the OR circuit of the PLG-ECU cannot turned off either. Accordingly, the power supply from the auxiliary battery to the main CPU of the PLG-ECU via the IGP relay is not stopped. Further, since "PIM", which is input to the sub-CPU of the PM-ECU, is not turned off as long as the IGP relay is not turned off, the sub-CPU of the PM-ECU keeps waiting for the OFF of "PIM" (see S035 of FIG. 10).

In this manner, the conventional technique has a possibility that the power cannot be turned off when the reset is caused in the PLG-ECU during the process of stopping the power supply.

Note that the default mode of the CPU (here, the main CPU 12 of the PLG-ECU 1) at the restoration from the reset state is the mode unknown (mode undefined state), and that the condition for allowing transition from this mode undefined state into the predetermined operation mode (charging mode and running mode) is not satisfied after the restoration is also given as one cause of the continuation of the mode undefined state. Similarly, another cause of the continuation of the mode undefined state is that the transition into the ending process (charging ending process) for the power OFF state (sleep state) is not allowed before the transition into the predetermined operation mode (charging mode and running mode) is carried out once (if the state is in the mode undefined state).

Moreover, a cause of continuation of the state in which the IGP signal is OFF (IGP signal ON is not received) is that, for example, the initial state of the IGP signal (value stored in the memory) of the main CPU 12 of the PLG-ECU 1 at the restoration from the reset state is the OFF state and after the restoration from the reset state, the IGP signal is turned off because the sub-CPU 11 is in the middle of the ending process, so that the IGP signal ON is not transmitted via the DMA communication from the sub-CPU 11 of the PLG-ECU 1. Moreover, another cause is that IGP signal ON is not transmitted either via CAN communication from the main CPU of the PM-ECU.

A cause of the continuation of the state in which the IGP signal is OFF (IGP signal ON is not received) is that the DMA communication between the sub-CPU and the main CPU is performed for every predetermined period on a predetermined data item (transmission is performed on the predetermined data item even though there is no change from the data content previously transmitted), and at the restoration of the main CPU 12 of the PLG-ECU 1 from the reset state, the IGP signal is turned off because the sub-CPU 11 of the PLG-ECU 1 is in the middle of the ending process, so that the IGP signal OFF is transmitted via the DMA communication from the sub-CPU 11 of the PLG-ECU 1.

Next, with reference to FIG. 11, an example is described in which the reset is caused in the PLG-ECU 1 in the process of stopping the power supply in the control system 100 according to Embodiment. FIG. 11 is a sequence diagram depicting the example in which the reset is caused in the PLG-ECU 1 during the process of stopping the power supply in the control system 100 according to Embodiment.

In a manner similar to FIG. 10, FIG. 11 depicts the example in which the reset is caused in the main CPU 12 of the PLG-ECU 1 just after the start of the process of stopping the power supply (see S041 of FIG. 11).

As depicted in FIG. 11, as soon as the main CPU 12 of the PLG-ECU 1 restores from the reset state and restarts the local bus 51 (see S042 of FIG. 11), the time for which the mode undefined state continues starts to be measured (Step S42). Here, the timing of starting the measurement is set to the timing just after the restart of the local bus 51; however, the timing may be set to the timing just after the restoration from the reset state.

When the mode undefined state has continued for a predetermined time, the main CPU 12 of the PLG-ECU 1 forcibly turns off "MRL_M" (Step S43). As a result, the state in which "MRL_M" cannot be turned off (see S034 of FIG. 10) and the state in which "PIM" OFF is awaited (see S035 of FIG. 10) are solved. Thus, the PLG-ECU 1 and the PM-ECU 2 can complete the process of stopping the power supply depicted in FIG. 4B.

Next, the specific operation of the sub-CPU 11 of the PLG-ECU 1 is described with reference to FIG. 12. FIG. 12 is a flowchart depicting the procedure of the process executed by the sub-CPU 11 of the PLG-ECU 1.

As depicted in FIG. 12, the sub-CPU 11 determines whether there has been an activation request or not when the state is the power OFF state or the sleep state (Step S601), and if it is determined that there has been the activation request (Yes in Step S601), the initializing process is executed (Step S602). Here, the determination on whether there has been the activation request or not is made based on signals "SW1" or "PLT" input from a charging plug. In other words, the sub-CPU 11 determines that there has been the activation request if the charging plug is inserted into the outlet. If there has been no activation request (No in Step S601), the sub-CPU 11 repeats the determination process of Step S601 until the activation request is received.

After the initializing process, the sub-CPU 11 turns on "MRL_S" (Step S603). Subsequently, the sub-CPU 11 determines whether "charging mode activation request" has been received or not (Step S604). The determination on whether "charging mode activation request" has been received or not is made by the presence or absence of the IGP connection request; for example, the IGP connection request is generated when the signal "SW1" or "PLT" input from the charging plug becomes the input state in which the charging plug is connected.

Note that in Embodiment, the charging is performed with wire (charging via a charging cable); however, the control system disclosed in the present application is applicable to a charging system allowing wireless charging (non-contact charging). In the case of the non-contact charging, the input of SW1 is, for example, the input of signal representing the existence of an external power source in the chargeable range or a switch input of starting the charging by a user.

In Step S604, if it is determined that there has been "charging mode activation request" (Yes in Step S604), the sub-CPU 11 turns on "IGP signal" as the mode signal corresponding to the charging mode (Step S605).

Next, the sub-CPU 11 executes the steady process such as the timer charging management (Step S606). The sub-CPU 11 determines whether "IGP off request" ON has been received or not (Step S607); if "IGP off request" has not been received (No in Step S607), the steady process of Step S606 is repeated. If it is determined that "IGP off request" ON has been received (Yes in Step S607), the sub-CPU 11 turns off "IGP signal" (Step S608).

In Step S604, if "the charging mode activation request" has not been received (No in Step S604), the sub-CPU 11 determines whether the running activation request has been received or not. Specifically, the sub-CPU 11 determines whether "IG2" has been turned on or not (Step S609). "IG2" is the signal input from the auxiliary battery 3 to the sub-CPU 11 via the IG2 relay 5, i.e., the signal input by the activation of the PM-ECU 2 when the IG switch is turned on, and is also the mode signal corresponding to the running mode (see FIG. 2).

If it is determined that "IG2" has been turned on (Yes in Step S609), the sub-CPU 11 executes the steady process such as the timer charging management (Step S610). The sub-CPU 11 determines whether "SW2" (for example, IG switch) has been turned off or not (Step S611) and if "SW2" has not been turned off (No in Step S611), the steady process of Step S610 is repeated. In the case where "IG2" is not turned on in Step S609 (No in Step S609), the sub-CPU 11 advances the process to Step S601.

Upon the completion of the process in Step S608 or the determination that "SW2" has been turned off (Yes in Step S611), the sub-CPU 11 turns off "MRL_S" (Step S612).

When "MRL_S" is turned off, the sub-CPU 11 determines whether the main CPU 12 has stopped or not (Step S613), and if it is determined that the main CPU'12 has stopped (Yes in Step S613), the state transits to the sleep state (Step S614) and the process ends. Note that if the main CPU 12 has not stopped (No in Step S613), the sub-CPU 11 repeats the determination process of Step S613 until the main CPU 12 stops.

Figure 13:
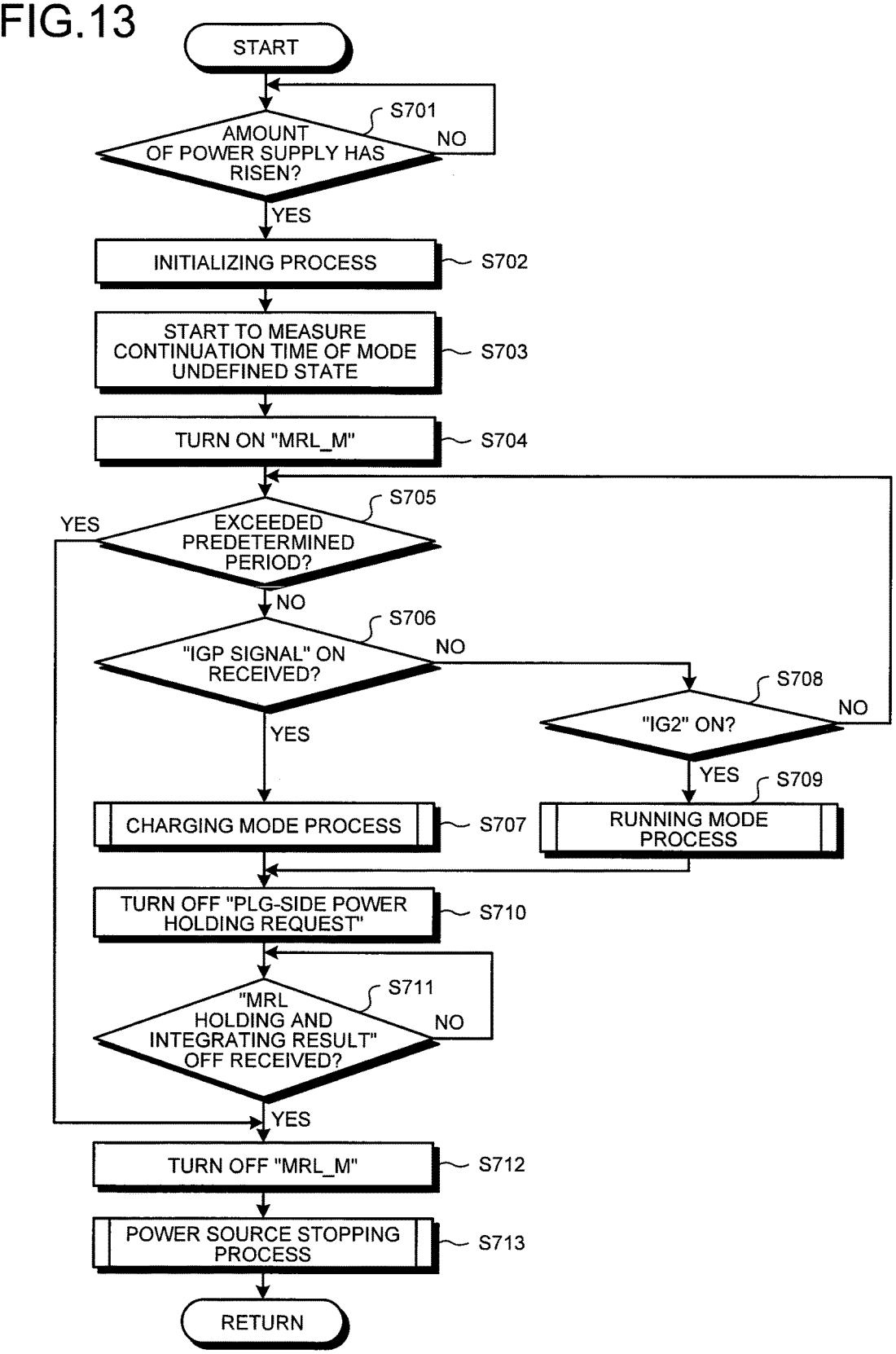
FIG. 13 is a flowchart depicting the procedure of the process executed by the main CPU of the PLG-ECU.

Next, the specific operation of the main CPU 12 of the PLG-ECU 1 is described with reference to FIG. 13. FIG. 13 is a flowchart depicting the procedure of the process executed by the main CPU 12 of the PLG-ECU 1.

As depicted in FIG. 13, the main CPU 12 determines whether the amount of power supply has risen up to a predetermined level (Step S701), and if the amount of power supply has risen to the predetermined level (Yes in Step S701), the initializing process is executed (Step S702). Note that if the amount of power supply has not risen to the predetermined level (No in Step S701), the main CPU 12 repeats the determination process of Step S701 until the amount of power supply reaches the predetermined level.

After the initializing process, the main CPU 12 starts to measure the time for which the mode undefined state continues (Step S703).

Next, the main CPU 12 turns on "MRL_M" (Step S704). When "MRL_M" is turned on, the state in which the IGP relay 4 is ON is maintained even after "MRL_S" is turned off. Thus, "MRL_M" is the signal for self-holding the power supply to the main CPU 12.

Subsequently, the main CPU 12 determines whether a predetermined time has passed from the start of the measurement of the continuation time of the mode undefined state (Step S705). On this occasion, if the predetermined time has not passed from the start of the measurement (No in Step S705), the main CPU 12 determines whether "IGP signal" ON has been received or not (Step S706).

If it is determined that "IGP signal" ON has been received in Step S706 (Yes in Step S706), the main CPU 12 executes the charging mode process (Step S707). The charging mode process is specifically described later with reference to FIG. 14A.

Meanwhile, if "IGP signal" ON is not received in Step S706 (No in Step S706), the main CPU 12 determines whether "IG2" has been turned on or not (Step S708). If it is determined that "IG2" has been turned on (Yes in Step S708), the main CPU 12 executes the running mode process (Step S709). This running mode process is specifically described with reference to FIG. 14B.

After the charging mode process or the running mode process, the main CPU 12 turns off "PLG-side power holding request" (Step S710) and transmits "PLG-side power holding request" OFF to the PM-ECU 2.

Subsequently, the main CPU 12 determines whether "MRL holding and integrating result" OFF has been received from the PM-ECU 2 or not (Step S711). If "MRL holding and integrating result" OFF has not been received (No in Step S711), the main CPU 12 repeats the determination process of Step S711 until "MRL holding and integrating result" OFF is received.

If it is determined that "MRL holding and integrating result" OFF has been received (Yes in Step S711), the main CPU 12 turns off "MRL_M" (Step S712), executes the power source stopping process (Step S713), and ends the process. The power source stopping process is specifically described later with reference to FIG. 14C.

Meanwhile, if "IG2" has not been turned on in Step S708 (No in Step S708), the main CPU 12 returns the process to Step S705 and repeats the process of Steps S705 to S708.

Here, for example, if the reset is caused in the main CPU 12 during the process of stopping the power supply, the main CPU 12 restored from the reset state restarts the process from the initializing process of Step S702. On this occasion, since both "IGP signal" and "IG2" are in the OFF state, the main CPU 12 repeats the process of Steps S705 to S708. In the conventional technique, once this state is obtained, the power cannot be turned off, which may result in the flat battery.

In contrast, in Embodiment, the continuation time of the mode undefined state exceeds the predetermined time while the process of Steps S705 to S708 is repeated. If it is determined that the continuation time of the mode undefined state has exceeded the predetermined time (Yes in Step S705), the main CPU 12 advances the process to Step S712 and turns off "MRL_M".

In this manner, even though the mode undefined state is obtained, the main CPU 12 forcibly turns off "MRL_M" by the time-out process. Thus, it is possible to avoid the situation in which the power cannot be turned off.

Figure 14A:
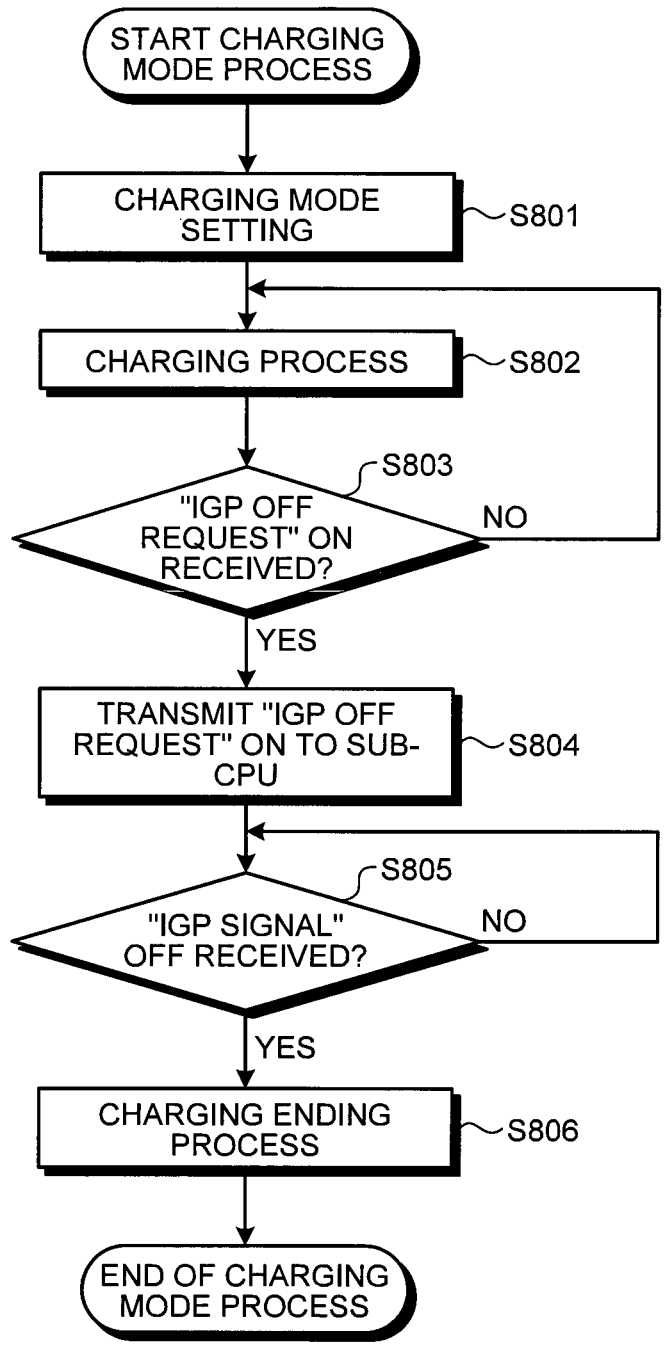
FIG. 14A is a flowchart depicting the procedure of the charging mode process executed by the main CPU of the PLG-ECU.

Next, the procedure in the charging mode process is described with reference to FIG. 14A. FIG. 14A is a flowchart depicting the procedure of the charging mode process executed by the main CPU 12 of the PLG-ECU 1.

As depicted in FIG. 14A, upon the start of the charging mode process, the main CPU 12 performs the charging mode setting (Step S801) and starts the charging process (Step S802). Subsequently, the main CPU 12 determines whether "IGP OFF request" ON has been received from the PM-ECU 2 or not (Step S803).

If it is determined that "IGP off request" ON has been received (Yes in Step S803), the main CPU 12 transmits "IGP off request" ON to the sub-CPU 11 (Step S804). If "IGP off request" ON has not been received in Step S803 (No in Step S803), the main CPU 12 returns the process to Step S802 and performs the charging process until "IGP off request" ON is received.

After the process of Step S804, the main CPU 12 determines whether "IGP signal" OFF has been received from the sub-CPU 11 or not (Step S805), and if it is determined that "IGP signal" OFF has been received (Yes in Step S805), the charging ending process is performed (Step S806) and the process ends. Note that if "IGP signal" OFF has not been received (No in Step S805), the main CPU 12 repeats the determination process of Step S805 until "IGP signal" OFF is received.

Figure 14B:
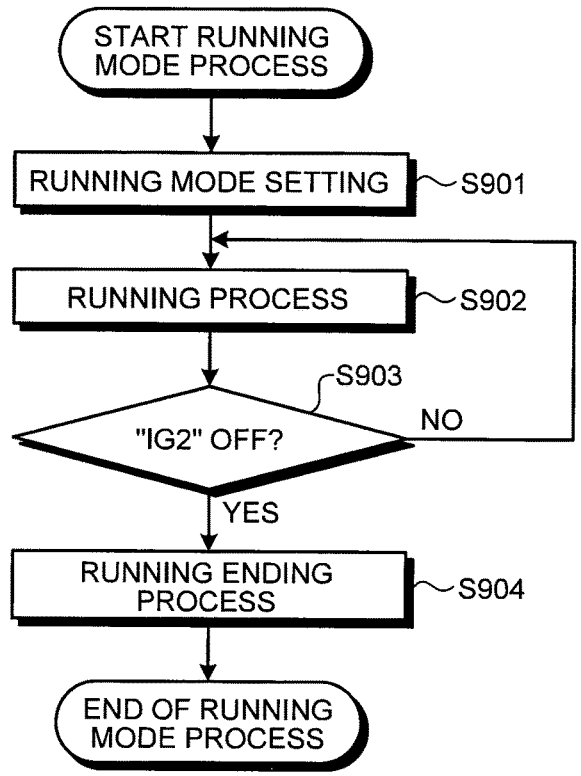
FIG. 14B is a flowchart depicting the procedure of the running mode process executed by the main CPU of the PLG-ECU.

Next, the procedure of the running mode process is described with reference to FIG. 14B. FIG. 14B is a flowchart depicting the procedure of the running mode process executed by the main CPU 12 of the PLG-ECU 1.

As depicted in FIG. 14B, upon the start of the running mode process, the main CPU 12 performs the running mode setting (Step S901) and starts the running process (Step S902).

Subsequently, the main CPU 12 determines whether "IG2" has been turned off or not (Step S903), and if it is determined that "IG2" has been turned off (Yes in Step S903), the main CPU 12 performs the running ending process (Step S904) and ends the process. If "IG2" has not been turned off (No in Step S903), the main CPU 12 returns the process to Step S902 and repeats the process of Step S902 and Step S903 until "IG2" is turned off.

Figure 14C:
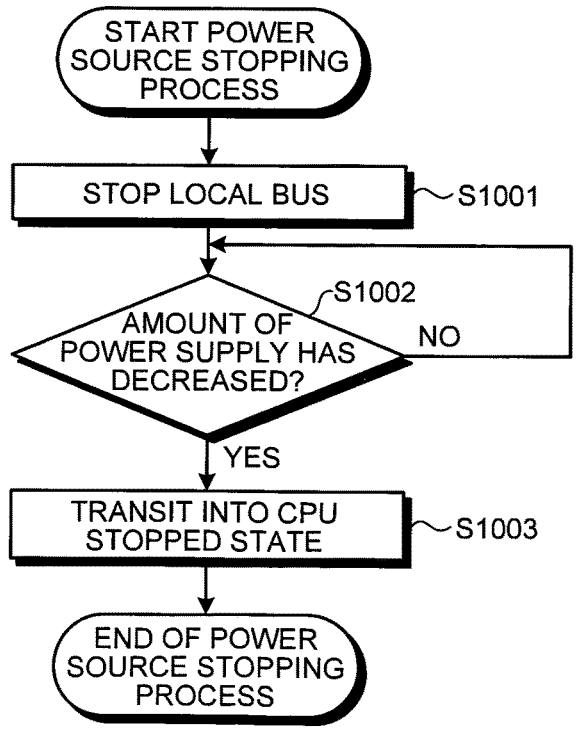
FIG. 14C is a flowchart depicting the procedure of the power source stopping process executed by the main CPU of the PLG-ECU.

Next, the power source stopping process is specifically described with reference to FIG. 14C. FIG. 14C is a flowchart depicting the procedure of the power source stopping process executed by the main CPU 12 of the PLG-ECU 1.

As depicted in FIG. 14C, upon the start of the power source stopping process, the main CPU 12 stops the local bus 51 (Step S1001), and determines whether the amount of power supply has decreased to a predetermined level (Step S1002). If it is determined that the amount of power supply has decreased to the predetermined level (Yes in Step S1002), the main CPU 12 transits into the CPU stopped state (Step S1003) and ends the process. If it is determined that the amount of power supply has not decreased to the predetermined level (No in Step S1002), the main CPU 12 repeats the determination process of Step S1002 until the power supply reaches the predetermined level.

In this manner, the PLG-ECU 1 includes the mode control section 11a, the ending process section 12a, and the power source stopping process section 12b. When the start of the charging mode ending process is ordered by the PM-ECU 2, the mode control section 11a turns off "IGP signal", which is the mode signal indicating that the current operation mode is the charging mode. When the charging mode ending process has completed up to the predetermined procedure (charging process), the ending process section 12a transmits the completion notification "PLG-side power holding request" OFF indicating that the procedure up to the charging process has been completed, to the PM-ECU 2.

If the stop of the power supply is permitted by the power source stopping Process section 22b of the PM-ECU 2, i.e., "MRL holding and integrating result" OFF is received, the power source stopping process section 12b performs he power source stopping process (corresponding to a second power source stopping process) for stopping the power supply to the own unit. Specifically, the power source stopping process section 12b turns off "MRL_M" when having received ""MRL holding and integrating result" OFF.

The power source stopping process section 12b forcibly performs the power source stopping process when the state in which all the mode signal "IGL signal" corresponding to the charging mode and the mode signal "IG2" corresponding to the running mode are OFF has continued for a predetermined time. Specifically, the power source stopping process section 12b measures the passage time from the transition into the initial state corresponding to the state just after the power input, and if the state in which both "IGP signal" and "IG2" are OFF has continued until the passage time exceeds the predetermined time, the power source stopping process section 12b forcibly performs the power source stopping process.

Therefore, according to Embodiment, it is possible to avoid the situation in which the power cannot be turned off.

As described so far, in Embodiment, the PLG-ECU and the PM-ECU forcibly perform the power supply stopping process if the mode undefined state continues for a predetermined time; therefore, it is possible to avoid the situation in which the power cannot be turned off.

Note that Embodiment has described the case in which the charging mode process is performed with the PLG-EUC and the PM-ECU working together. However, the first control unit and the second control unit may be other control units than the PLG-ECU and the PM-ECU. Further, the predetermined operation mode executed between the first control unit and the second control unit may be other operation mode than the charging mode.

Embodiment of the control system according to the present application has been described in detail with reference to the drawings; however, these are just examples and various modifications and improvements can be made in the implementation of the present invention on the basis of the knowledge of a person skilled in the art.

INDUSTRIAL APPLICABILITY

The control system according to the present invention is effective for avoiding the situation in which the power cannot be turned off; in particular, the system can be applied to the vehicle control system.

REFERENCE SIGNS LIST

1 PLG-ECU
11 Sub-CPU
11a Mode control section
12 Main CPU
12a Ending process section
12b Power source stopping process section
13 DMA communication line
14 OR circuit
2 PM-ECU
21 Sub-CPU
22 Main CPU
22a Ending process section
22b Power source stopping process section
23 DMA communication line
24 OR circuit
25 Power source integration IC
3 Auxiliary battery
4 IGP relay
5 IG2 relay
6 IGCT relay
7 Charger
8 Battery
9 System main relay
51 Local bus
52 CAN bus
53 CAN bus
54 Local bus
100 Control system

The invention claimed is:

1. A control system that controls charging of a battery of a vehicle, comprising:
a first controller; and
a second controller connected to the first controller;
the first controller including:
a first processor configured to:
when a condition for ending a predetermined operation mode is satisfied, perform stop control by which the control system enters a low-power-consumption state while communicating with the second controller;

in response to a mode undefined state that is an unstable state resulting from recovering from a reset state of the second controller during the stop control, measure a time for which the mode undefined state continues;

determine whether the time has passed a predetermined period; and in response to the time having passed the predetermined period, resume the stop control; and a second processor configured to:

when a predetermined transition condition is satisfied in the mode undefined state, transition into an operation mode whose transition condition has been satisfied.

2. The control system according to claim 1, wherein
the operation mode includes a charging mode for charging the battery of the vehicle with power from an external power source provided outside the vehicle,
the second processor is further configured to transition the operation mode into the charging mode when a first power source signal as a signal controlling a connection state of a first power source route for supplying power to the first controller in the charging mode is detected as being in an ON state requesting a connected state, and
the first processor is further configured to produce an OFF state requesting that the first power source signal is set to a disconnected state during the stop control.

3. The control system according to claim 1, wherein
the first processor is further configured to perform a process of stopping power supply after a process of ending the predetermined operation mode is performed, and
the first processor is further configured to forcibly transition the process to a process of stopping the power supply when the mode undefined state has continued for a predetermined period.

4. The control system according to claim 3, wherein
the second processor is further configured to turn off a mode signal representing that a current operation mode is the predetermined operation mode when start of the process of ending the predetermined operation mode is ordered by the second controller,
the first processor is further configured to, when the ending process has completed up to a predetermined procedure, transmit a completion notification indicating the completion up to the predetermined procedure to the second controller,
a third processor of the second controller is configured to perform a power source stopping process that permits stop of power supply to the first controller when the ending process has been completed up to the predetermined procedure and the completion notification has been received from the first controller, and
the third processor is configured to perform the power source stopping process when a state in which all mode signals corresponding to a plurality of operation modes including the predetermined operation mode are OFF has continued for a predetermined period.

5. The control system according to claim 4, wherein
the third processor is further configured to measure a passage time from the transition into an initial state as a state just after power input, and when the state in which all the mode signals are OFF has continued until the passage time exceeds the predetermined time, perform the power source stopping process.

6. The control system according to claim 4, wherein
the third processor is further configured to perform the power source stopping process when the state in which all the mode signals corresponding to a plurality of operation modes including the predetermined operation mode are OFF has continued for the predetermined period and when the completion notification has been received from the first controller.

7. The control system according to claim 3, wherein
a third processor of the second controller is configured to perform a power source stopping process that permits stop of power supply to the first controller when the ending process has been completed up to a predetermined procedure and a completion notification indicating completion of the ending process up to the predetermined procedure has been received from the first controller,
the second processor is further configured to turn off a mode signal representing that a current operation mode is the predetermined operation mode when start of the process of ending the predetermined operation mode is ordered by the second controller,
the first processor is further configured to transmit the completion notification to the second controller when the ending process has been completed up to the predetermined procedure, and perform a second power source stopping process that stops the power supply to the first controller when the stop of power supply is permitted by the third processor, and
the first processor is configured to perform the second power source stopping process when a state in which all mode signals corresponding to a plurality of operation modes including the predetermined operation mode are OFF has continued for the predetermined period.

8. The control system according to claim 7, wherein
the first processor is further configured to measure a passage time from transition into an initial state as a state just after power input, and when a state in which all the mode signals are OFF has continued until the passage time exceeds the predetermined time, performs the second power source stopping process.

9. The control system according to claim 5, wherein
the third processor is further configured to perform the power source stopping process when the state in which all the mode signals corresponding to a plurality of operation modes including the predetermined operation mode are OFF has continued for the predetermined period and when the completion notification has been received from the first controller.

* * * * *